US008549334B2

(12) United States Patent
Inoue et al.

(10) Patent No.: US 8,549,334 B2
(45) Date of Patent: Oct. 1, 2013

(54) ELECTRIC POWER CONTROL SUPPORT DEVICE AND ELECTRIC POWER CONTROL SUPPORT METHOD

(75) Inventors: Tsuyoshi Inoue, Nara (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 279 days.

(21) Appl. No.: 13/056,758

(22) PCT Filed: Jun. 15, 2010

(86) PCT No.: PCT/JP2010/003953
§ 371 (c)(1),
(2), (4) Date: Jan. 31, 2011

(87) PCT Pub. No.: WO2010/150480
PCT Pub. Date: Dec. 29, 2010

(65) Prior Publication Data
US 2011/0138202 A1 Jun. 9, 2011

(30) Foreign Application Priority Data

Jun. 25, 2009 (JP) ................................. 2009-151580

(51) Int. Cl.
*H04N 5/76* (2006.01)
*G06F 1/00* (2006.01)

(52) U.S. Cl.
USPC ........................................ 713/310; 386/296

(58) Field of Classification Search
USPC ......................................... 713/310; 386/296
See application file for complete search history.

(56) References Cited

U.S. PATENT DOCUMENTS

| 7,010,589 | B2 * | 3/2006 | Ewing et al. ................. 709/223 |
| 7,181,293 | B2 * | 2/2007 | Rothman et al. ............... 700/22 |
| 8,145,753 | B2 * | 3/2012 | Inoue et al. ................... 709/224 |
| 8,250,339 | B2 * | 8/2012 | Master et al. .................. 712/15 |
| 8,281,162 | B2 * | 10/2012 | Huang .......................... 713/300 |
| 2002/0124198 | A1 * | 9/2002 | Bormann et al. ............. 713/323 |
| 2004/0148548 | A1 * | 7/2004 | Moyer et al. .................... 714/25 |

(Continued)

FOREIGN PATENT DOCUMENTS

| JP | 4-102909 | 4/1992 |
| JP | 8-094778 | 4/1996 |
| JP | 9-116970 | 5/1997 |
| JP | 10-126862 | 5/1998 |
| JP | 10-262048 | 9/1998 |
| JP | 2002-090467 | 3/2002 |
| JP | 2002-186054 | 6/2002 |
| JP | 2003-219483 | 7/2003 |
| JP | 2003-284161 | 10/2003 |
| JP | 2003-289585 | 10/2003 |
| JP | 2004-086383 | 3/2004 |
| JP | 2004-185612 | 7/2004 |
| JP | 2006-033428 | 2/2006 |
| JP | 2008-205882 | 9/2008 |

OTHER PUBLICATIONS

International Search Report issued Jul. 13, 2010 in International (PCT) Application No. PCT/JP2010/003953.

*Primary Examiner* — Paul R Myers
*Assistant Examiner* — Christopher a Daly
(74) *Attorney, Agent, or Firm* — Wenderoth, Lind & Ponack, L.L.P.

(57) ABSTRACT

An electric power control support device (101) includes: an electricity consumption receiving unit (102) that receives, from each of devices, operation data indicating a time period during which the device is operating; an electricity consumption history storage unit (103) storing the received operation data; a subordinate-superior relationship determination unit (105) that determines, from the devices, a superior device operating independently and a sub device operating in conjunction with the superior device, based on a temporal position relationship between operating sections temporally overlapping each other; a power-off forgetting determination unit (107) that specifies the sub device operating while the superior device is not operating; and the energy saving support execution unit (108) that supports energy saving for the sub device specified by the power-off forgetting determination unit (107).

17 Claims, 30 Drawing Sheets

(56) References Cited

U.S. PATENT DOCUMENTS

| | | | |
|---|---|---|---|
| 2004/0199796 A1* | 10/2004 | Boros | 713/300 |
| 2006/0053219 A1 | 3/2006 | Kutsumi et al. | |
| 2009/0270138 A1* | 10/2009 | Raveendran | 455/574 |
| 2010/0175094 A1* | 7/2010 | Ono | 725/79 |
| 2011/0150431 A1* | 6/2011 | Klappert | 386/296 |
| 2011/0238988 A1* | 9/2011 | Tanaka et al. | 713/168 |
| 2011/0264932 A1* | 10/2011 | Park et al. | 713/310 |
| 2012/0271471 A1* | 10/2012 | Lee et al. | 700/292 |

* cited by examiner

FIG. 6

| Measuring Time 601 | Electricity Consumption [W] of Device ID1 602 | Electricity Consumption [W] of Device ID2 604 | Electricity Consumption [W] of Device ID3 605 | ... 607 |
|---|---|---|---|---|
| 19:00:10 | 125 | 0 | ... | ... |
| 19:00:20 | 128 | 0 | ... | ... |
| 19:00:30 | 120 | 0 | ... | ... |
| 19:00:40 | 126 | 52 | ... | ... |
| 19:00:50 | 126 | 38 | ... | ... |
| 19:01:00 | 146 | 42 | ... | ... |
| 19:01:10 | 118 | 45 | ... | ... |
| 19:01:20 | 120 | 37 | ... | ... |
| 19:01:30 | 125 | 40 | ... | ... |
| 19:01:40 | 137 | 41 | ... | ... |
| 19:01:50 | 128 | 37 | ... | ... |
| ... | ... | ... | ... | ... |

FIG. 8

| | Device ID1 801 | 803 | Device ID2 | | ... |
|---|---|---|---|---|---|
| Section Number 802 | Operating Section | | Section Number | Operating Section | |
| 1 | 2008/3/2/06:05:10 - 2008/3/2/07:36:40 | | 1 | 2008/3/2/06:05:50 - 2008/3/2/08:40:50 | ⋮ |
| 2 | 2008/3/2/8:10:20 - 2008/3/2/11:45:30 | | 2 | 2008/3/2/9:30:20 - 2008/3/2/10:00:00 | ⋮ |
| ⋮ | ⋮ | | ⋮ | ⋮ | ⋮ |
| ⋮ | ⋮ | | ⋮ | ⋮ | ⋮ |
| ⋮ | ⋮ | | ⋮ | ⋮ | ⋮ |
| ⋮ | ⋮ | | ⋮ | ⋮ | ⋮ |
| ⋮ | ⋮ | | ⋮ | ⋮ | ⋮ |

FIG. 12A

Score Calculation Target Device : TV
Associated Device : Reproduction Device

| Section Pair Number | Operating Section of Score Calculation Target Device | Overlapping Operating Section of Associated Device |
|---|---|---|
| 1 | T1 | R1 |
| 2 | T2 | R1 |
| 3 | T2 | R2 |
| 4 | T3 | R3 |
| 5 | T4 | R3 |
| 6 | T4 | R4 |

FIG. 12B

Score Calculation Target Device : Reproduction Device
Associated Device : TV

| Section Pair Number | Operating Section of Score Calculation Target Device | Overlapping Operating Section of Associated Device |
|---|---|---|
| 1 | R1 | T1 |
| 2 | R1 | T2 |
| 3 | R2 | T2 |
| 4 | R3 | T3 |
| 5 | R3 | T4 |
| 6 | R4 | T4 |

FIG. 13

| Kind | Concept Diagram | Determination Conditions (Definitions) |
|---|---|---|
| Entire Overlapping | | Both start and end of operating section of associated device are within respective Δt. |
| Prior Overlapping | | Start of operating section of associated device is prior to operation section of the target device. → End is within or prior to corresponding Δt. (If end is subsequent to corresponding Δt, this state is classified to external overlapping.) |
| Subsequent Overlapping | | End of operating section of associated device is subsequent to the operation section of the target device. → Start is within or subsequent to corresponding Δt. (If end is within or prior to corresponding Δt, this sate is classified to external overlapping.) |
| Internal Overlapping | | Both start and end of operating section of associated device are between the two Δt, or one of them is between the two Δt, and the other one is within corresponding Δt. |
| External Overlapping | | Both start and end of operating section of associated device are outside of the two Δt (In other words, start is prior to corresponding Δt and end is subsequent to corresponding Δt.) |

FIG. 14A

Score Calculation Target Device : TV
Associated Device : Reproduction Device

| Section Pair Number | Operating Section of Score Calculation Target Device | Overlapping Operating Section of Associated Device | Kind of Section Overlapping |
|---|---|---|---|
| 1 | T1 | R1 | Subsequent Overlapping |
| 2 | T2 | R1 | Prior Overlapping |
| 3 | T2 | R2 | Subsequent Overlapping |
| 4 | T3 | R3 | Subsequent Overlapping |
| 5 | T4 | R3 | Prior Overlapping |
| 6 | T4 | R4 | Subsequent Overlapping |

FIG. 14B

Score Calculation Target Device : Reproduction Device
Associated Device : TV

| Section Pair Number | Operating Section of Score Calculation Target Device | Overlapping Operating Section of Associated Device | Kind of Section Overlapping |
|---|---|---|---|
| 1 | R1 | T1 | Internal Overlapping |
| 2 | R1 | T2 | Subsequent Overlapping |
| 3 | R2 | T2 | Prior Overlapping |
| 4 | R3 | T3 | Internal Overlapping |
| 5 | R3 | T4 | Subsequent Overlapping |
| 6 | R4 | T4 | Prior Overlapping |

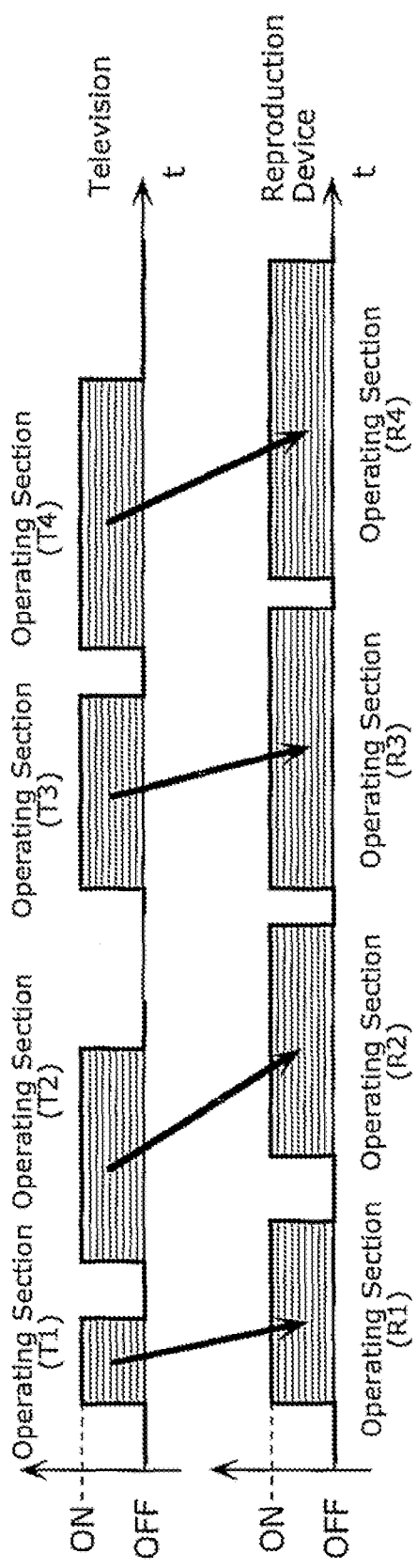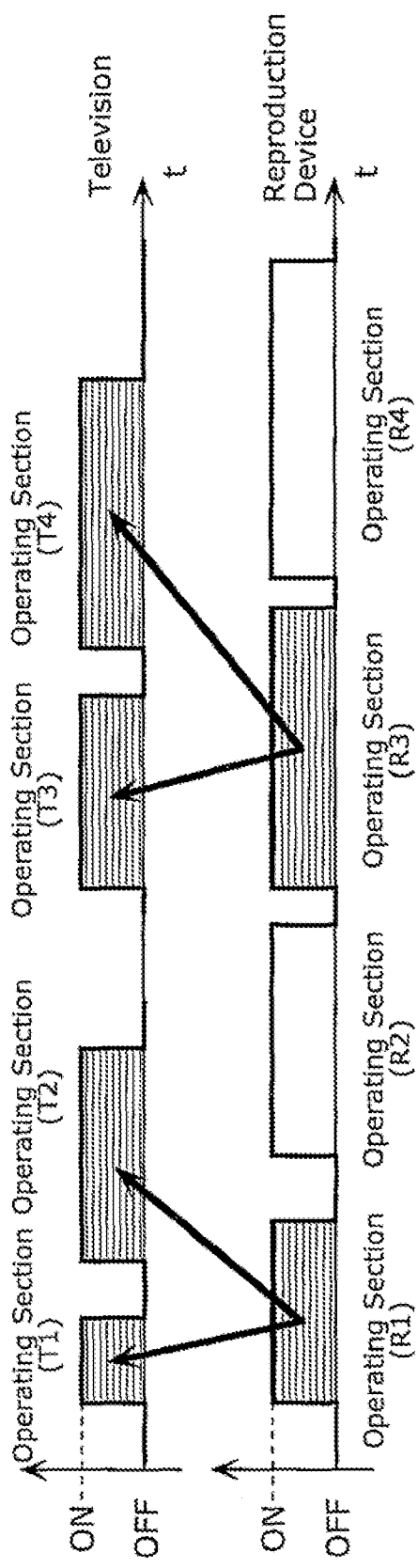

FIG. 16

| Conjunction Combination Number | Electrical Device 1 | Electrical Device 2 | Superior Device Score (Electrical Device 1) | Superior Device Score (Electrical Device 2) |
|---|---|---|---|---|
| 1 | Television | Reproduction Device | 4.0 | 2.0 |
| 2 | Television | Game Device | . | . |
| 3 | Air Conditioner | Television | . | . |
| . | . | . | . | . |
| . | . | . | . | . |
| . | . | . | . | . |

| Conjunction Combination Number | Electrical Device 1 | Electrical Device 2 | Superior Device Score (Electrical Device 1) | Superior Device Score (Electrical Device 2) | Superior Device | Sub Device |
|---|---|---|---|---|---|---|
| 1 | Television | Reproduction Device | 4.0 | 2.0 | TV | Reproduction Device |
| 2 | Television | Game Device | · | · | · | · |
| 3 | Air Conditioner | Television | · | · | · | · |
| · | · | · | · | · | · | · |
| ·· | ·· | ·· | ·· | ·· | ·· | ·· |

| | Superior Device | Sub Device | |
|---|---|---|---|
| 1 | TV | TV | Edit |
| 2 | TV | Game Device | Edit |
| 3 | PC | Printer | Edit |

----Device Subordinate-Superior Relationship----

FIG. 21

| Presented Date | Presented Electric Power Information Measurement Time Period | Superior Device | Sub Device | Power-OFF Forgetting Counts / Total Electricity Consumption | Presented Details (Kind, Amount, Unit) |
|---|---|---|---|---|---|
| 2101 | 2102 | 2103 | 2104 | 2105 | 2106 |
| 2008/3/9 18:30 | 2008/3/2 - 2008/3/9 | TV | Reproduction Device | Counts : ○ Counts Total Consumed Electric Energy : ΔkWh | Consumed Electric Energy, 3 kWh (per day) Electricity Expense, 70 yen (per day) |
| · · | · · | · · | · · | · · | · · |
| · · | · · | · · | · · | · · | · · |
| · · | · · | · · | · · | · · | · · |

ELECTRIC POWER CONTROL SUPPORT DEVICE AND ELECTRIC POWER CONTROL SUPPORT METHOD

TECHNICAL FIELD

The present invention relates to electric power control support devices and electric power control support methods which support energy saving by reducing electricity consumption of electrical devices used in home.

BACKGROUND ART

In recent years, many electrical devices (home appliances) are used in home, and used electricity in home has been increased more and more. In the circumstances, various devices have been proposed to reduce unnecessary electricity consumption of electrical devices. For example, there is disclosed a home appliance power management device that monitors power states of a plurality of electrical devices and thereby controls the respective electrical devices to be powered ON/OFF based on a schedule set by a user (see Patent Reference 1, for example). There is also discloses a technology in which a sensor is provided between an existing electrical device and an electrical outlet to detect any moving or static object, and a power switch controls the electrical device to be powered ON/OFF based on detection results of the sensor (see Patent Reference 2, for example).

PRIOR ARTS

Patent References

[Patent Reference 1] Japanese Unexamined Patent Application Publication No. 2003-219483
[Patent Reference 2] Japanese Unexamined Patent Application Publication No. 2002-90467

DISCLOSURE OF INVENTION

Problems that Invention is to Solve

FIG. 1 shows an example of data of measuring electricity consumption of a reproduction device such as a Digital Versatile Disc (DVD) player and a television (TV). In the graph, a horizontal axis represents a time, and a vertical axis represents consumed electric energy. With reference to FIG. 1, it is learned that electricity consumption of the reproduction device sometimes remains large although electricity consumption of the TV is reduced. This is because the reproduction device has not yet been powered OFF (remains ON) although the TV is OFF. In order to watch video reproduced by the reproduction device, the TV should be ON. It is therefore considered that, in the above state, the reproduction device has been forgotten to be powered OFF, causing unnecessary electricity consumption for which energy saving should be executed. It should be noted that, in FIG. 1, the reproduction device has a function of being automatically powered OFF after a predetermined time period since the last input operation.

The conventional technology disclosed in Patent Reference 1 allows a user to previously set, in the home appliance power management device, a time period after a certain time during which a target electrical device is not used, such as night-time. The home appliance power management device determines that the electrical device has been forgotten to be powered OFF if electricity consumption of the electrical device in the set time period has a value equal to or more than a predetermined value. Based on the determination, the home appliance power management device can power OFF the electrical device determined as having being forgotten to be powered OFF. However, the reproduction device as shown in FIG. 1 consumes power to be saved for several time periods in one day, and time zones of such time periods daily vary. For such devices, it is difficult to employ the conventional technology disclosed in Patent Reference 1. This is because it is very difficult to expect a time period in which a user would forget to power OFF the electrical device. As explained above, the conventional technology has a problem of failing to reduce electricity consumption of such electrical devices.

The conventional technology disclosed in Patent Reference 2 controls an electrical device to be powered ON/OFF based on detection results of the sensor. Therefore, if a user uses a reproduction device and then uses a personal computer in the same room while forgetting to power OFF the reproduction device, the sensor detects the user as a moving object. In the above situation, the power switch of Patent Reference 2 fails to determine that the reproduction device is forgotten to be powered OFF. As a result, electricity consumption reduction cannot be performed for the electrical device. Thus, the conventional technologies disclosed Patent References 1 and 2 have a problem of a low execution efficiency of energy saving for electrical devices.

In order to solve the above-described problems, an object of the present invention is to provide an electric power control support device having a high execution efficiency of energy saving for electrical devices.

Means to Solve the Problems

In accordance with an aspect of the present invention for achieving the object, there is provided an electric power control support device, including: a receiving unit configured to receive pieces of operation data regarding respective devices, the pieces of the operation data each indicating an operating section that is a time period during which a corresponding one of the devices is operating; a storage unit configured to store the pieces of operation data received by the receiving unit; a subordinate-superior relationship determination unit configured to determine, from the devices, a superior device that operates independently and a sub device that operates in conjunction with the superior device, based on a temporal position relationship between operating sections temporally overlapping each other between the devices, the temporal position relationship being indicated by the pieces of operation data stored in the storage unit; a specification unit configured to specify the sub device operating while the superior device is not operating, based on the pieces of operation data regarding the devices which are stored in the storage unit; and an electric power control support execution unit configured to transmit a signal to one of (a) the sub device specified by the specification unit and (b) a device to perform processing based on an operation state of the sub device, the signal being for supporting electric power control of the sub device based on the operation state of the sub device.

With the above structure, subordinate-superior relationships among a plurality of devices are determined based on pieces of operation data (operation histories) of the devices. In addition, a sub device(s) forgotten to be powered OFF is/are determined from the devices based on the subordinate-superior relationships, and signals are transmitted to support electric power control for the determined sub device(s) in order to execute energy saving support. More specifically, a sub device operating (namely, is powered ON) while a superior device is not operating (namely, is powered OFF) is determined. It is thereby possible to execute energy saving support to reduce electricity consumption resulting from temporal and also chronic forgetting of powering OFF. As a result, an electric power control support device having a high execution efficiency of energy saving for electrical devices can be provided.

It should be noted that the present invention can be implemented not only as the electric power control support device including the above-described characteristic processing units, but also as an electric power control support method including steps performed by the characteristic processing units included in the electric power control support device. In addition, the present invention can be implemented as a computer program causing a computer to execute the characteristic steps included in the electric power control support method. Of course, the computer program can be distributed via a computer-readable recording medium such as a Compact Disc-Read Only Memory (CD-ROM) or via a communication network such as the Internet.

Effects of the Invention

Thus, the electric power control support device according to the present invention can execute energy saving support to reduce electricity consumption resulting from temporal and also chronic forgetting of powering OFF.

BRIEF DESCRIPTION OF DRAWINGS

FIG. 6 is a table showing an example of the electricity consumption data stored in an electricity consumption history storage unit.

FIG. 8 is a table showing an example of device operating section data stored in the electricity consumption history storage unit.

FIG. 12A is a table showing results of extraction of overlapping operating sections, by using the data shown in FIG. 10.

FIG. 12B is a table showing results of extraction of overlapping operating sections, by using the data shown in FIG. 10.

FIG. 13 is a table showing an example of kinds and definitions of various overlapping states.

FIG. 14A is a table showing a result of determining kinds of overlapping states for each section shown in FIG. 12A.

FIG. 14B is a table showing a result of determining kinds of overlapping states for each section shown in FIG. 12B.

FIG. 15A is a graph showing each conjunction relationship between operating sections shown in FIG. 10.

FIG. 15B is a graph showing each conjunction relationship between operating sections shown in FIG. 10.

FIG. 16 is a table showing an example of conjunction device data stored in the device relationship storage unit.

FIG. 17 is a table showing an example of the conjunction device data shown in FIG. 16 added with results of subordinate-superior relationship determination.

FIG. 19 is a diagram showing an example of an edit screen for conjunction device data according to a first variation of the embodiment of the present invention.

FIG. 21 is a diagram showing an example of history data of energy saving support presentation information stored in an electricity consumption history storage unit according to a third variation of the embodiment of the present invention.

BEST MODE FOR CARRYING OUT THE INVENTION

The following describes an embodiment of the present invention with reference to the drawings.

Figure 2:
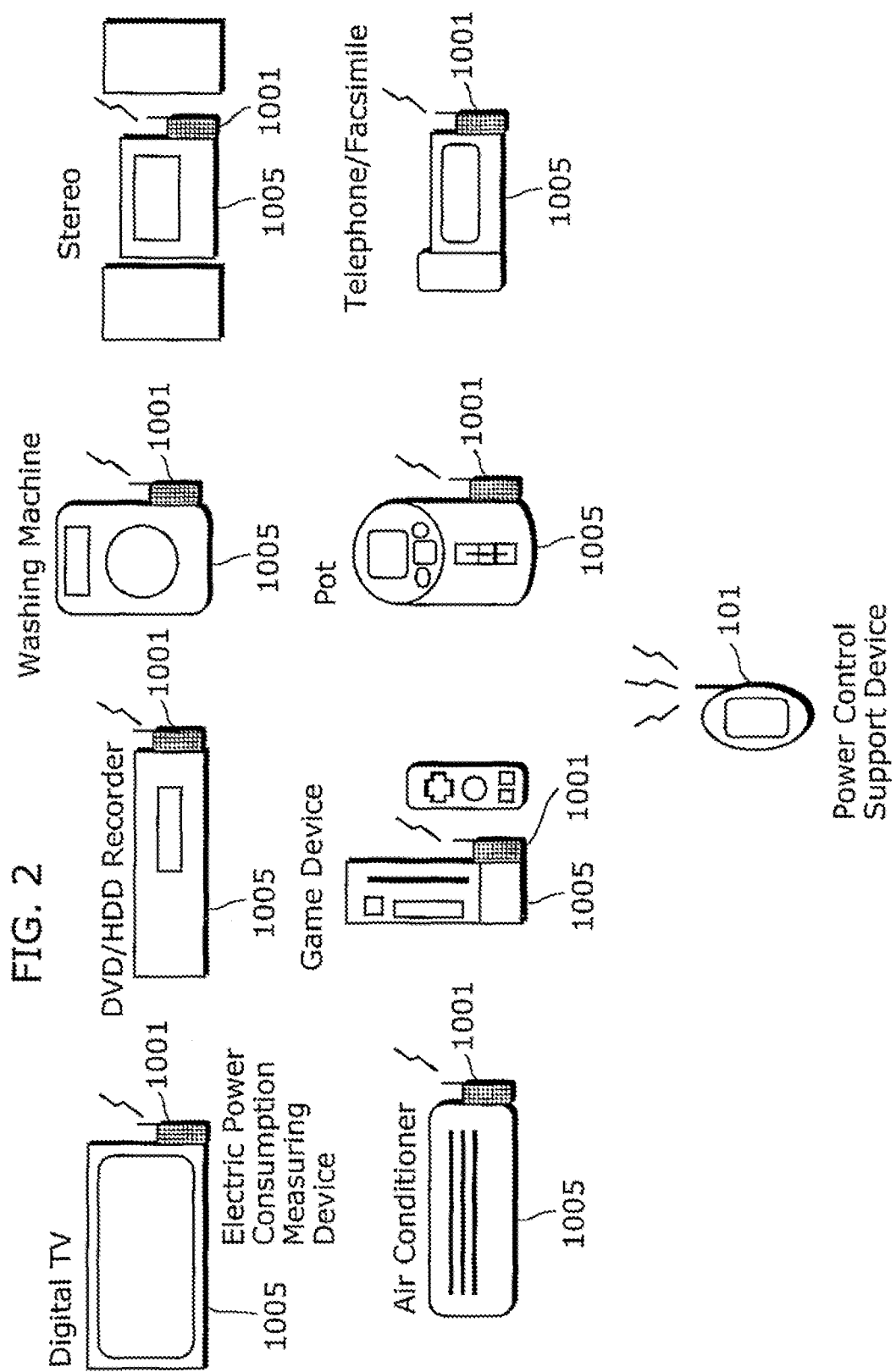
FIG. 2 is a diagram showing a schematic configuration of an energy saving support system according to an embodiment of the present invention.

FIG. 2 is a diagram showing a schematic configuration of an energy saving support system according to the embodiment of the present invention. The energy saving support system includes: a plurality of electrical devices 1005 such, as a digital TV and a washing machine which are equipped in home; and an electric power control support device 101. Hereinafter, the electrical devices 1005 are referred to also as "devices" for the sake of convenience.

Each of the electrical devices 1005 includes an electricity consumption measuring device 1001. The electricity consumption measuring device 1001 measures electricity consumption of the corresponding electrical device 1005 to generate chronological electricity consumption data.

The electric power control support device 101 gathers pieces of chronological electricity consumption data generated by a plurality of the electrical devices 1005. Based on the gathered pieces of chronological electricity consumption data, the electric power control support device 101 determines subordinate-superior relationships among the electrical devices 1005. Hereinafter, a "superior" electrical device 1005 in a subordinate-superior relationship (referred to as a "superior device") refers to an electrical device 1005 having a possibility of operating independently. On the other hand, a "subordinate" electrical device 1005 in a subordinate-superior relationship (referred to as a "sub device") refers to an electrical device 1005 that operates in conjunction with a corresponding superior device and that does not basically operate independently. In the embodiment, the description is given for a method of determining subordinate-superior relationships among the electrical devices 1005. The description is also given for a method of specifying, based on the determination results, a sub device(s) forgotten to be powered OFF, so as to execute energy saving support of the sub device(s).

Figure 3:
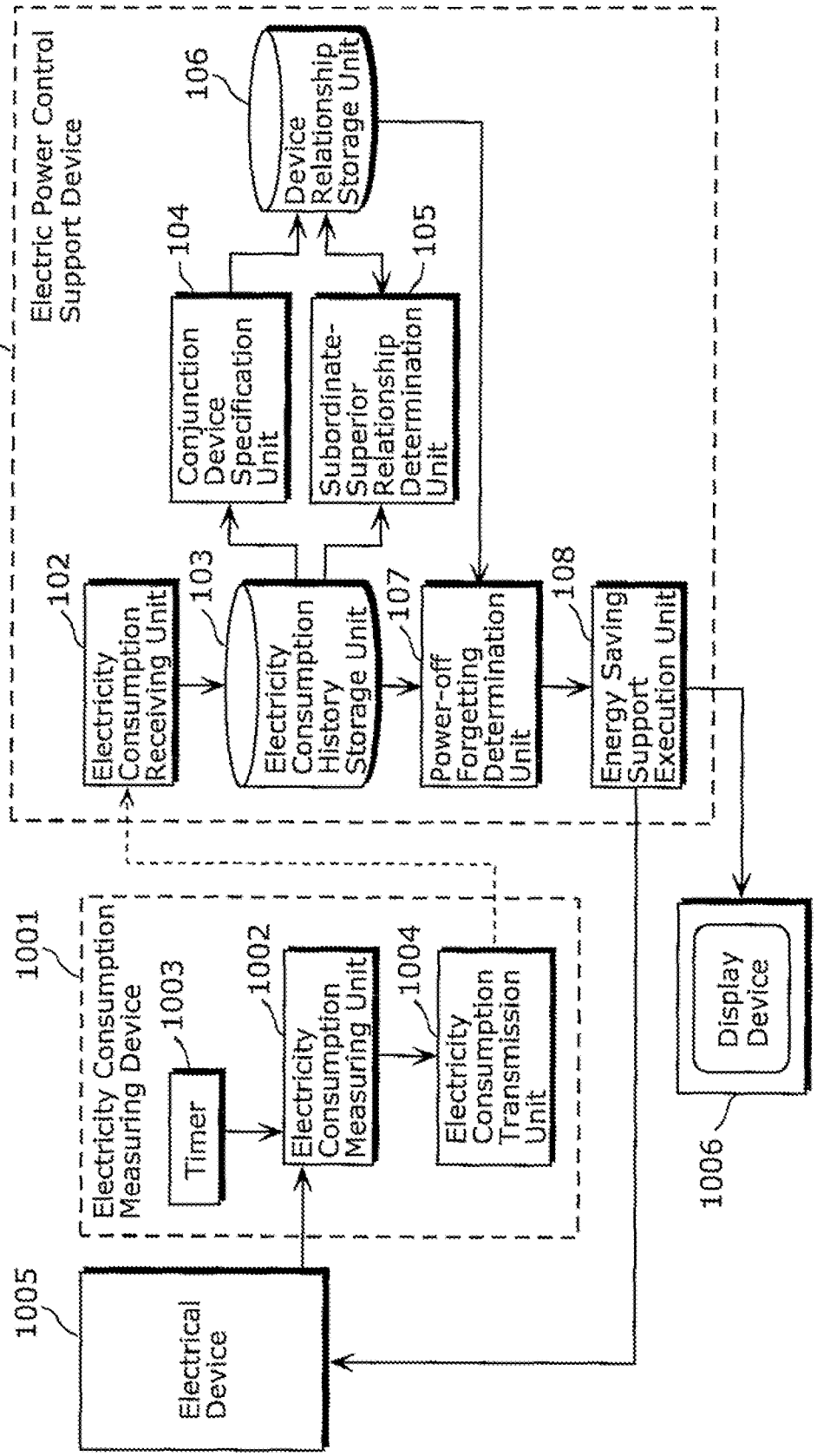
FIG. 3 is a block diagram showing functional structures of an electricity consumption measuring device and an electric power control support device which are included in the energy saving support system according to the embodiment of the present invention.

FIG. 3 is a block diagram showing functional structures of the electricity consumption measuring device 1001 and the electric power control support device 101 which are included in the energy saving support system.

The electricity consumption measuring device 1001 includes an electricity consumption measuring unit 1002, a timer 1003, and an electricity consumption transmission unit 1004.

The electricity consumption measuring unit 1002 is connected to a corresponding electrical device 1005 to measure electricity consumption of the electrical device 1005. Electricity consumption is calculated by, for example, multiplying (a) a value of a voltage applied to the electrical device 1005 by (b) a value of a current flowing into the electrical device 1005. The electricity consumption measuring unit 1002 provides the electricity consumption transmission unit 1004 with the measured electricity consumption value together with a present time counted by the timer 1003. Here, a time interval for measuring electricity consumption is previously set, and the timer 1003 also measures the time interval.

The electricity consumption transmission unit 1004 transmits, to the electric power control support device 101, the measured electricity consumption value and the time data regarding the electrical device (hereinafter, a set of the electricity consumption value and the time data is referred to simply as "electricity consumption data"). It should be noted that the electricity consumption data may be transmitted wirelessly or via a wire.

The electric power control support device 101 includes a electricity consumption receiving unit 102, an electricity consumption history storage unit 103, a conjunction device specification unit 104, a subordinate-superior relationship determination unit 105, a device relationship storage unit 106, a power-off forgetting determination unit 107, and an energy saving support execution unit 108.

The electricity consumption receiving unit 102 receives pieces of operation data from the devices, and provides the pieces operation data to the electricity consumption history storage unit 103. A piece of the operation data indicates operating sections that are time periods in each of which a corresponding device is operating. In more detail, the electricity consumption receiving unit 102 receives a piece of electricity consumption data of each of the electrical devices 1005 from the corresponding electricity consumption measuring device 1001 provided to the corresponding electrical device 1005, and transmits the received piece of electricity consumption data to the electricity consumption history storage unit 103. Here, the state where a device is operating means a state where the device is ON and consumes electric energy equal to or more than a predetermined amount in a predetermined time period. On the other hand, the state where a device is not operating means a state where the device is OFF, or a state where the device is ON but consumes electric energy less than the predetermined amount in the predetermined time period. An example of the state where a device is operating is a state where the device is ON and a user uses the device, such as a state where the user reproduces video by a DVD player. Another example of the state where a device is operating is a state where the device is ON and the user does not currently use the device but can use it anytime, such as a state where a DVD player is ON but video is not currently reproduced. On the other hand, in the state where a device is not operating, the device is OFF, or the device Is on standby consuming standby electric power (electric energy less than the predetermined amount in the predetermined time period).

The electricity consumption history storage unit 103 holds the pieces of electricity consumption data of the respective electrical devices 1005 which are provided from the electricity consumption receiving unit 102.

The conjunction device specification unit 104 compares, for the predetermined time period, the pieces of electricity consumption data of the electrical devices 1005 stored in the electricity consumption history storage unit 103 to one another, thereby specifying conjunction devices. The conjunction device specification unit 104 stores the specification results to the device relationship storage unit 106. Here, the conjunction devices are a group of devices which are used at the same time and also include a device that would probably be forgotten to be powered OFF if only the device is operating.

The subordinate-superior relationship determination unit 105 determines a subordinate-superior relationship between the devices determined by the conjunction device specification unit as conjunction devices. The subordinate-superior relationship determination unit 105 stores the determination results to the device relationship storage unit 106. Here, a device determined as being a "superior" device is not always OFF when a device determined as being a "sub" device is OFF. However, a device determined as being a "sub" device should be OFF, when a device determined as being a "superior" device is OFF In other words, a device determined as a "sub" device operates in conjunction with a device determined as being a "superior" device, and basically does not operate independently.

The power-off forgetting determination unit 107 determines that a device determined as being a "sub" device has been forgotten to be powered OFF, if the subordinate-superior relationship determination unit 105 determines that the device determined as being a "sub" device is ON but the device determined as being a "superior" device is OFF.

Based on results of the power-off forgetting determination unit 107, the energy saving support execution unit 108 displays, on a display device 1006, a message for notifying the forgetting of powering OFF the sub device, for example. Or, the energy saving support execution unit 108 controls the forgotten sub device to be powered ON/OFF. Thereby, the energy saving support execution unit 108 supports energy saving for the device which the user has forgotten to power OFF.

Figure 4:
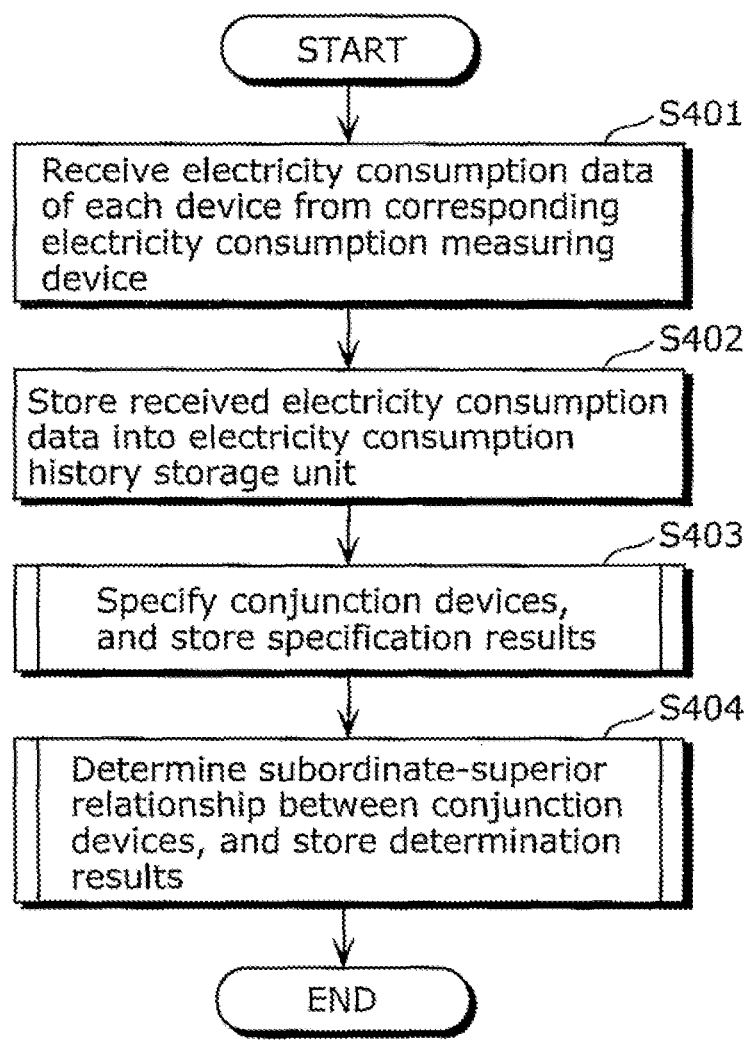
FIG. 4 is a flowchart of processing for determining subordinate-superior relationships among devices by using electricity consumption data measured for a predetermined time period.

Next, the processing performed by the electric power control support device is described in detail with reference to flowcharts of FIGS. 4 and 5.

The processing performed by the electric power control support device is mainly classified into two. One of them is processing shown in FIG. 4. In the processing, a subordinate-superior relationship between the devices is determined based on the pieces of electricity consumption data generated for a predetermined time period. The other one is processing shown in FIG. 5. In the processing, energy saving support is executed based on the subordinate-superior relationship between the devices which is determined according to the flowchart of FIG. 4. Here, since the processing of FIG. 4 is necessary in the processing of FIG. 5, it is performed prior to the processing of FIG. 5. It should be noted that the processing of FIG. 4 for the subordinate-superior relationship determination may be performed not only once but a plurality of times at regular intervals. The processing of FIG. 4 may also be performed based on a certain event, for example, after energy saving support that is the processing of FIG. 5.

First, the processing for determining a subordinate-superior relationship (subordinate-superior relationship determination) is described with reference to the flowchart of FIG. 4.

The electricity consumption receiving unit 102 receives pieces of electricity consumption data of the electrical devices 1005 from respective electricity consumption measuring devices 1001 provided to the electrical devices 1005.

The electricity consumption receiving unit 102 stores the received pieces of electricity consumption data of the electrical devices 1005 to the electricity consumption history storage unit 103 (S402). An example of the pieces of electricity consumption data stored in the electricity consumption history storage unit 103 is shown in FIG. 6. The accumulated electricity consumption data includes a measuring time and electricity consumption values of the respective devices. In more detail, an item 601 indicates a time of measuring electricity consumption of the electrical devices 1005, and items after the item 601 indicate the electricity consumption values of the respective electrical devices 1005. Each of the electrical devices 1005 is identified by a device ID. The items 602, 604, and 605 indicate electricity consumption values of the electrical devices 1005 having device IDs 1, 2, and 3, respectively, which are measured at the measuring time indicated in the item 601. For example, FIG. 6 shows that, at a measuring time of "19:00:10" (19 o'clock, 0 minute, 10 seconds), electricity consumption of the electrical device 1005 having the device ID1 has a value of 125 W, and electricity consumption of the electrical device 1005 having the device ID2 has a value of 0 W. Here, in FIG. 6, only the item 601 is indicated as an item for a measuring time, assuming that all of the electrical devices 1005 measure electricity consumption at the same timing. However, in the case where the electrical devices 1005 measure electricity consumption at different timings, it is also possible to store, for each of the electrical devices 1005, an electricity consumption value and a measuring time in association with each other in the electricity consumption history storage unit 103.

It is also possible that the step of receiving electricity consumption data (S401) and the step of storing the electricity consumption data (S402) are always performed and the following steps may be performed as needed.

The conjunction device specification unit 104 compares, for the predetermined time period, the pieces of electricity consumption data of the electrical devices 1005 stored in the electricity consumption history storage unit 103 to one another, so as to specify devices operating in conjunction with each other (hereinafter, such devices are referred to as "conjunction devices"). The conjunction device specification unit 104 stores the specification results to the device relationship storage unit 106 (S403). The step of specifying conjunction devices (S403) will be described later in detail.

The subordinate-superior relationship determination unit 105 determines a subordinate-superior relationship between two electrical devices 1005 determined at the conjunction device specification step (S403) as conjunction devices (S404). The subordinate-superior relationship determination is made based on device operating section data stored in the electricity consumption history storage unit 103 which will be described later, and conjunction device data stored in the device relationship storage unit 106.

Figure 7:
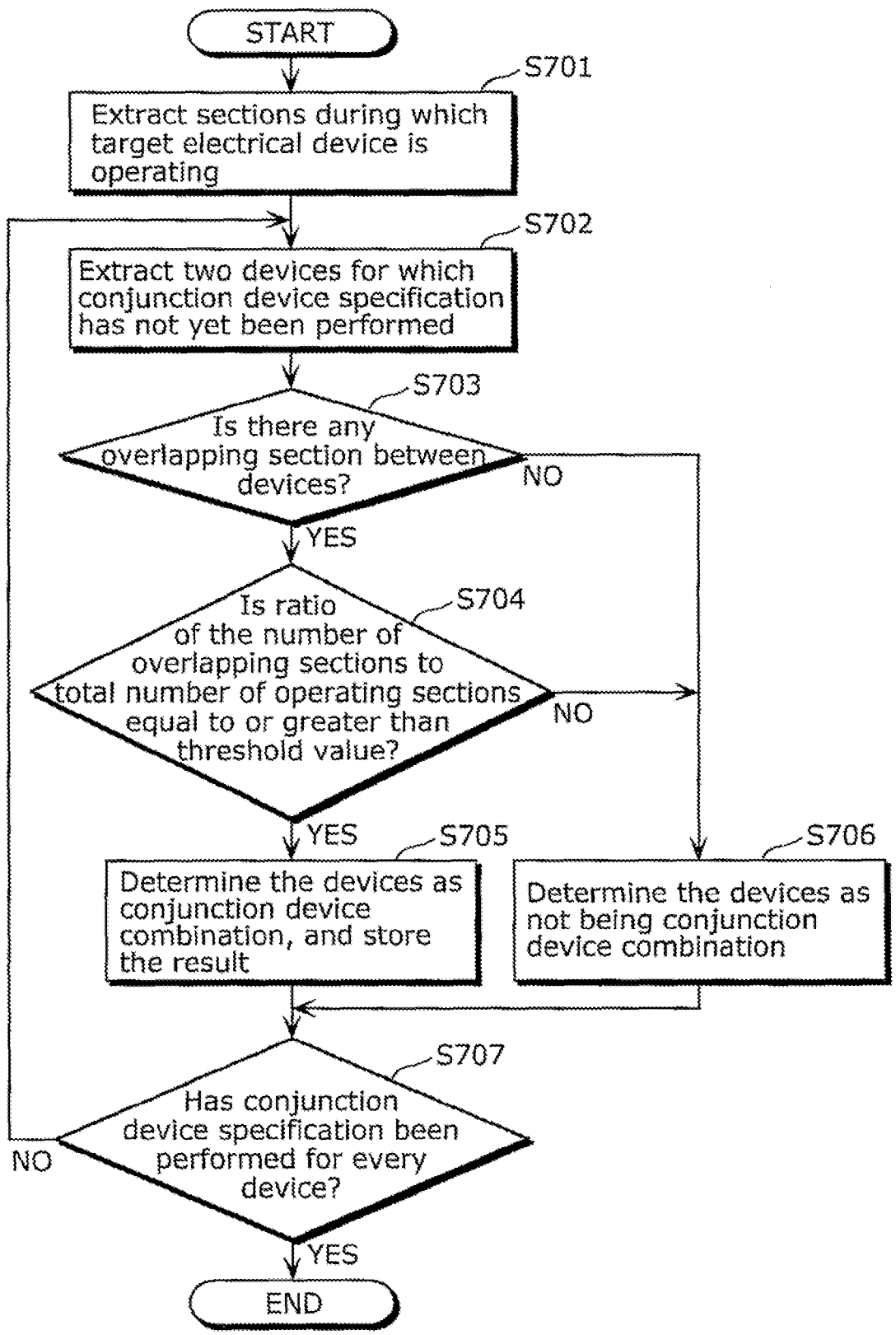
FIG. 7 is a flowchart of processing performed by a conjunction device specification unit.

The conjunction device specification step (S403) performed by the conjunction device specification unit 104 is described in detail with reference to a flowchart of FIG. 7.

From electricity consumption data of each of the electrical devices 1005 which is stored in the electricity consumption history storage unit 103, the conjunction device specification unit 104 extracts time sections in each of which the corresponding electrical device 1005 is operating (S701). Then, the conjunction device specification unit 104 determines whether or not an electricity consumption value of each electrical device 1005 is greater than a threshold value predetermined for the device, thereby determining whether or not the device is operating. The threshold value may be predetermined, or calculated from the electricity consumption data. It is also possible that the conjunction device specification unit 104 determines that the electrical device 1005 is operating if the electricity consumption value of the electrical device 1005 is kept greater than the threshold value over a predetermined time period (for example, 5 minutes). It is further possible that the conjunction device specification unit 104 determines that the electrical device 1005 is kept operating if the electricity consumption value of the electrical device 1005 repeatedly becomes greater than the threshold value within the predetermined time period. Data indicating a time section (hereinafter, referred to simply as an "operating section") during which the electrical device 1005 is operating is stored as device operating section data to the electricity consumption history storage unit 103.

FIG. 8 is a table showing an example of the device operating section data. The accumulated device operating section data includes pieces of operating section information of each of the electrical devices 1005. For example, an item 801 indicates pieces of operating section information regarding the electrical device 1005 having the device ID1. The item 801 includes an item 802 and an item 803. The item 802 indicates a section number for identifying an operating section. The item 803 indicates an operating section associated with the section number. The operating section is indicated by an operating start time and an operating end time of the electrical device 1005. For example, an operation section associated with a section number 1 of the electrical device 1005 having the device ID1 indicates that the electrical device 1005 starts operating at an operating start time of 06:05:10 on Mar. 2, 2008 and ends the operating at an operating end time of 07:36:40 on Mar. 2, 2008.

The conjunction device specification unit 104 extracts a combination of two electrical devices 1005 for which the conjunction device specification has not yet been performed (S702).

The conjunction device specification unit 104 compares operating sections of the two electrical devices 1005 extracted at the extraction step (S702), and thereby determines whether or not there are any operating sections overlapping each other (S703).

If there are no operating sections overlapping each other (NO at S703), then the conjunction device specification unit 104 determines that the two electrical devices 1005 extracted at the extraction step (S702) are not conjunction devices (S706).

On the other hand, if there is at least one combination of operating sections overlapping each other (YES at S703), then the conjunction device specification unit 104 calculates a ratio of (a) a total number of operating sections of each of the two electrical devices 1005 extracted at the extraction step (S702) to (b) the number of operating sections overlapping between the two electrical devices 1005 (hereinafter, referred to as an "overlapping section ratio"). The conjunction device specification unit 104 compares the calculated overlapping section ratio to a predetermined threshold value (S704).

Figure 9:
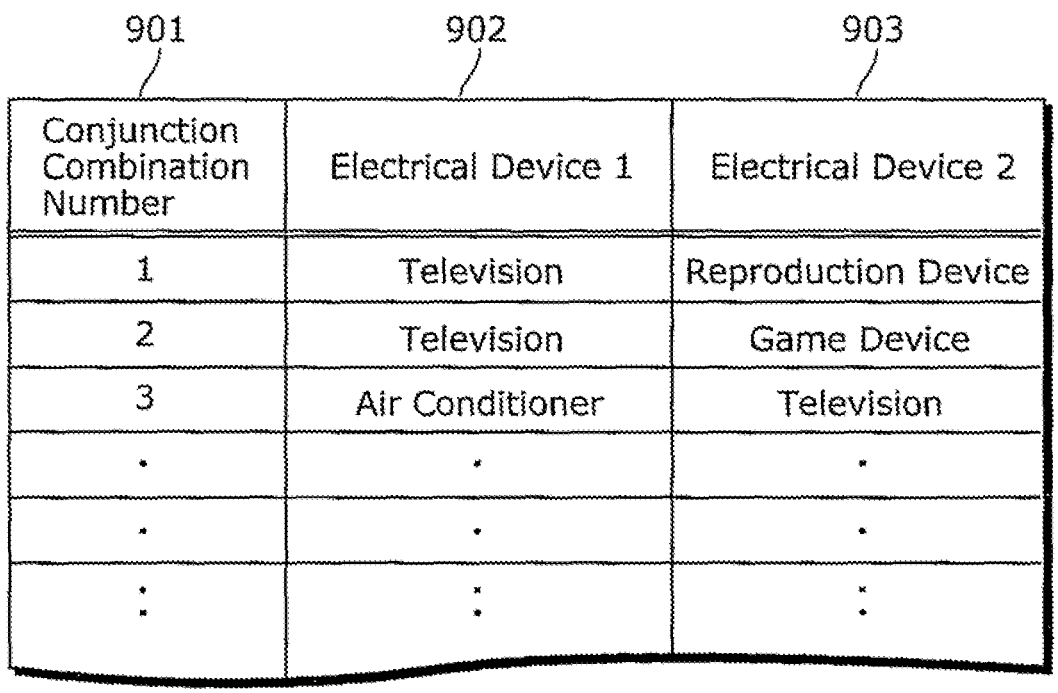
FIG. 9 is a table showing an example of conjunction device data stored in a device relationship storage unit.

If one of the two overlapping section ratios generated for the respective two electrical devices 1005 is equal or greater than the predetermined threshold value (YES at S704), then the conjunction device specification unit 104 determines that the two electrical devices 1005 are conjunction devices (S705). The determination result is stored as conjunction device data into the device relationship storage unit 106. FIG. 9 shows an example of such conjunction device data stored in the device relationship storage unit 106. The conjunction device data includes items 901 to 903. The item 901 is a conjunction combination number for identifying a combination of devices (hereinafter, referred to simply as "conjunction device combination") determined as operating in conjunction with each other. The item 902 and the item 903 indicate names of the respective electrical devices 1005 determines as the conjunction device combination. For example, a conjunction device combination having a conjunction combination number 1 is a combination of a TV and a reproduction device, which means that the TV and the reproduction device operate in conjunction with each other. It should be noted that the items 902 and 903 may indicate devices ID instead of the device names.

Referring back to FIG. 7, on the other hand, if each of the two overlapping section ratios generated for the respective two electrical devices 1005 is smaller than the predetermined threshold value (NO at S704), then the conjunction device specification unit 104 determines that the two electrical devices 1005 as targets for the conjunction device specification are not a conjunction device combination (S706).

The determination is under the concepts that electrical devices 1005 having more operating overlapping between them have a higher possibility of forming a conjunction device combination, and electrical devices 1005 having more operating sections in which the electrical devices 1005 operate independently have a lower possibility of forming a conjunction device combination. Therefore, operation sections including overlapping sections can be used instead of the above-described overlapping sections, in order to calculate an overlapping section ratio.

Figure 1:
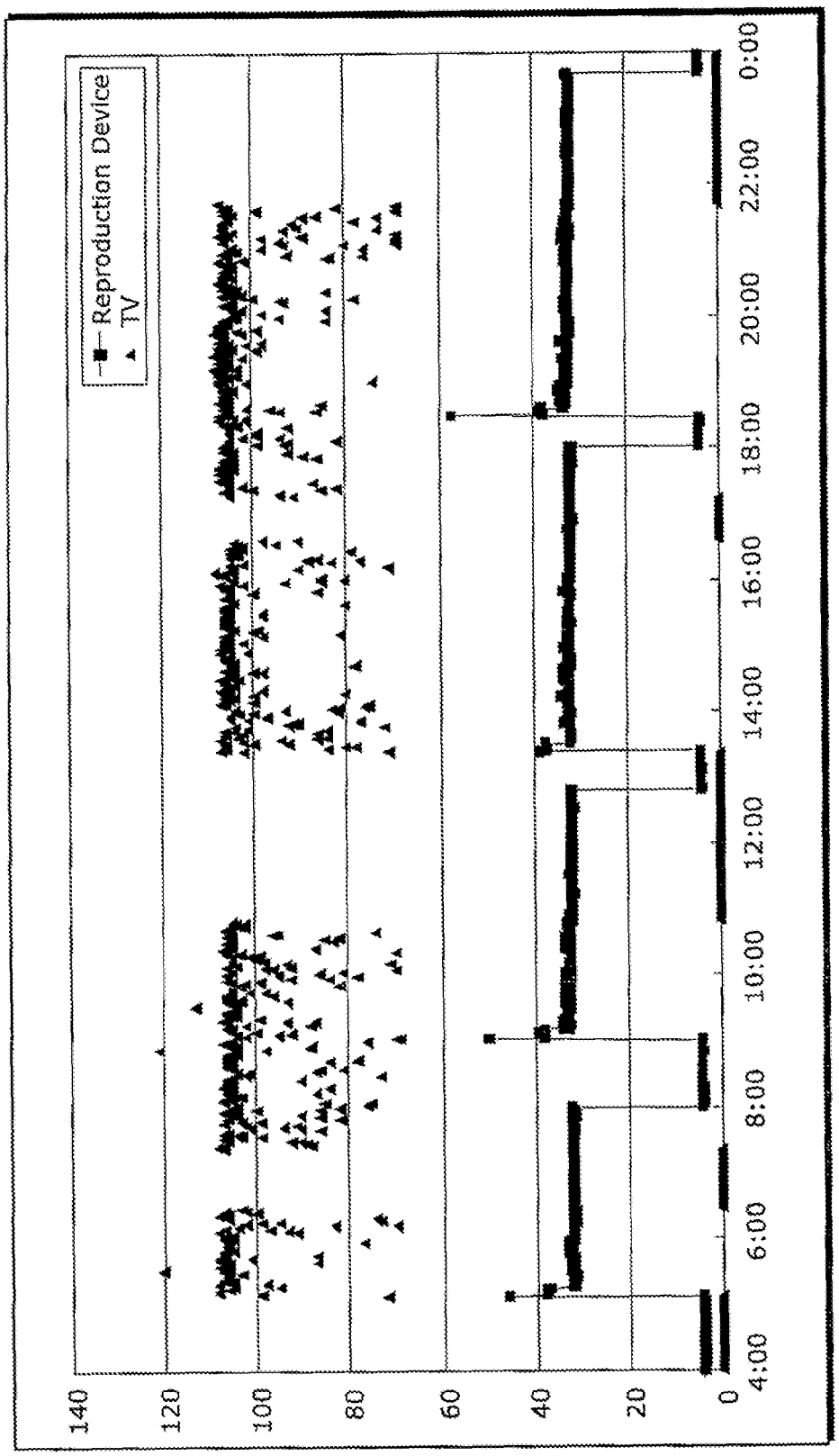
FIG. 1 is a graph showing an example of results of measuring electricity consumption of a TV and a reproduction device.
Figure 10:
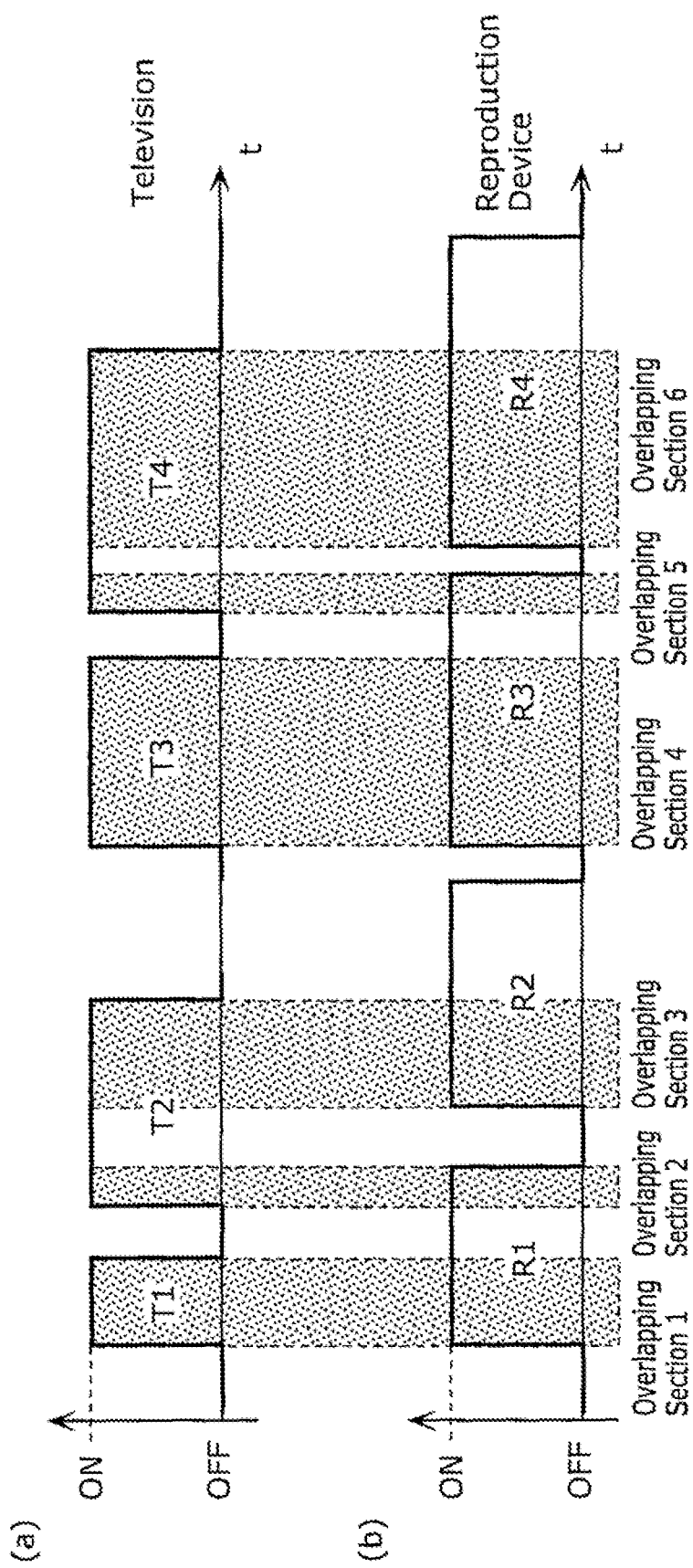
FIG. 10 is a graph plotting measurement values shown in FIG. 1 by binary data representing whether or not a device is operating.

Measurement values of electricity consumption of the TV and the reproduction device which are shown in FIG. 1 are expressed in (a) and (b), respectively, in FIG. 10. Here, each of the measurement values is represented by binary data indicating whether or not each electrical device 1005 is used.

In each graph of (a) and (b) in FIG. 10, a horizontal axis represents a time, and a vertical axis represents whether or not the electrical device 1005 is operating. According to the vertical axis, ON represents that the electrical device 1005 is operating, and OFF represents that the electrical device 1005 is not operating. As shown in (a) in FIG. 10, the TV has four operating sections (operating sections T1 to T4). As shown in (b) in FIG. 10, the reproduction device has four operating sections (operating sections R1 to R4). The operating section T1 temporally overlaps the operating section R1 in an overlapping section 1. The operating section T2 temporally overlaps the operating section R1 in an overlapping section 2 and also overlaps the operation section R2 in an overlapping section 3. The operating section T3 temporally overlaps the operating section R3 in an overlapping section 4. The operating section T4 temporally overlaps the operating section R3 in an overlapping section 5 and also overlaps the operation section R4 in an overlapping section 6. Therefore, each of the TV and the reproduction device has four operating sections and six overlapping sections. In this case, an overlapping section ratio for each of the two electrical devices 1005 is the same 1.5. If the threshold value is 0.8, the two electrical devices 1005 shown in FIG. 10 are determined as forming a conjunction device combination.

The following description is given assuming that the combination of the TV and the reproduction device having the data example of FIG. 1 is the conjunction device combination having the conjunction combination number 1 in FIG. 9.

The conjunction device specification unit 104 determines whether or not the conjunction device specification (S702 to S706) has already been performed for every combination of electrical devices 1005 (S707). If the conjunction device specification (S702 to S706) has been performed for every combination of the electrical devices 1005 (YES at S707), then the conjunction device specification unit 104 completes the conjunction device specification. On the other hand, if there is any combination of the electrical devices 1005 for which the conjunction device specification (S702 to S706) has not yet been performed (NO at S707), then the conjunction device specification unit 104 performs the conjunction device specification (S702 to S706).

Figure 11:
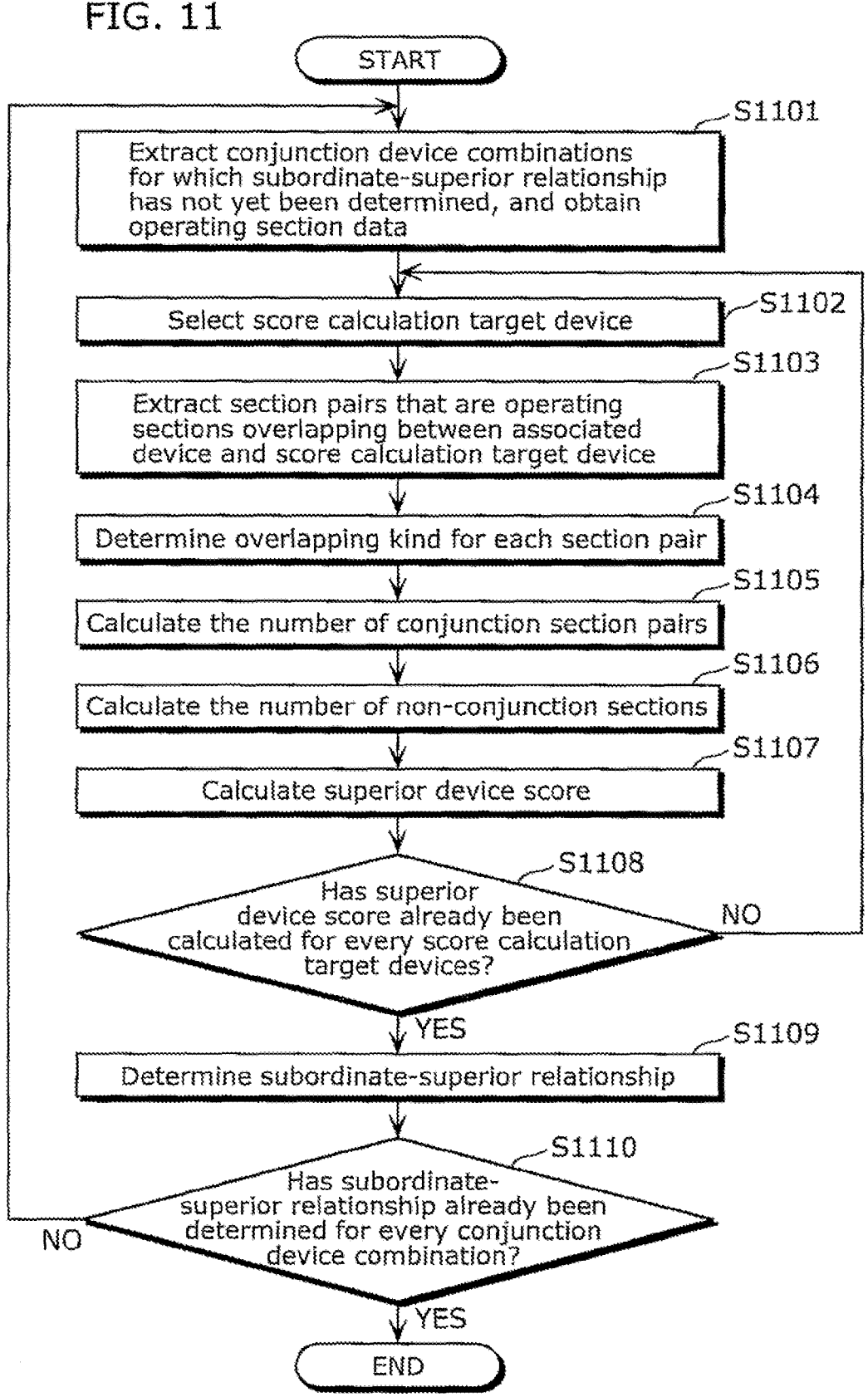
FIG. 11 is a flowchart of processing performed by a subordinate-superior relationship determination unit.

The following describes the subordinate-superior relationship determination step (S404) performed by the subordinate-superior relationship determination unit 105 in detail with reference to a flowchart of FIG. 11.

From the conjunction device data stored in the device relationship storage unit 106, the subordinate-superior relationship determination unit 105 extracts conjunction device combinations for which a subordinate-superior relationship has not yet been determined. The subordinate-superior relationship determination unit 105 obtains the device operating section data regarding the extracted conjunction device combinations, from the electricity consumption history storage unit 103 (S1101). For example, in the case of the conjunction device combination having the conjunction combination number 1 in FIG. 9, the obtained device operating section data is plotted as in the graph of FIG. 10.

For each of the extracted conjunction device combinations, the subordinate-superior relationship determination unit 105 performs steps S1102 to S1107 as described later. Thereby, the subordinate-superior relationship determination unit 105 calculates a score (hereinafter, referred to as a "superior device score"). The score is proportional to a possibility of being a superior device, and therefore used to determine a subordinate-superior relationship. Hereinafter, a device for which a superior device score is calculated is referred to as a "score calculation target device", and a device operating in conjunction with the score calculation target device is referred to simply as an "associated device".

The subordinate-superior relationship determination unit 105 selects, from among devices in the conjunction device combinations extracted at S1101, an electrical device 1005 for which a superior device score has not yet been calculated, and the subordinate-superior relationship determination unit 105 determines the selected device as a score calculation target device (S1102).

The subordinate-superior relationship determination unit 105 extracts operating sections of an associated device having operating sections overlapping respective operating sections of the score calculation target device, thereby generating section pairs (S1103). In the case of the device operating section data of FIG. 10, if the TV is selected as a score calculation target device, section pairs are as shown in FIG. 12A. On the other hand, if the reproduction device is selected as a score calculation target device, section pairs are as shown in FIG. 12B. In FIGS. 12A and 128, an item 1201 indicates a section pair number for identifying a section pair. An item 1202 indicates an operating section of the score calculation target device. An item 1203 indicates an operating section of the associated device which overlaps the operating section of the score calculation target device indicated in the item 1202. For example, device operating section data having the section number 1 in FIG. 12A indicates that the operating section T1 of the score calculation target device overlaps the operating section R1 of the associated device so that the operating sections T1 and R1 is a section pair.

The subordinate-superior relationship determination unit 105 determines a kind of an overlapping state of every section pair extracted at S1103 (S1104). The determination of overlapping state kinds uses information indicating how the operating sections of the electrical devices 1005 overlap each other. An example of kinds and definitions of overlapping states is shown in FIG. 13. It is assumed in FIG. 13 that there are five kinds of overlapping states of operating sections, which are entire overlapping, prior overlapping, subsequent overlapping, internal overlapping, and external overlapping. In FIG. 13, an operating section of a score calculation target device is represented by an operating section 1301, and an operating section of an associated device is represented by an operating section 1302.

The entire overlapping refers to a state where an operating start time of the associated device is within a range of a time period $\Delta t$ having a center time that is an operating start time of the score calculation target device, and an operating end time of the associated device is within another time period $\Delta t$ having a center time that is an operating end time of the score calculation target device. The prior overlapping refers to a state where an operating start time of the associated device is prior to the time period $\Delta t$ having the center time that is the operating start time of the score calculation target device, and an operating end time of the associated device is within or prior to the other time period $\Delta t$ having a center time that is the operating end time of the score calculation target device. The subsequent overlapping refers to a state where an operating start time of the associated device is within or subsequent to the range of the time period $\Delta t$ having a center time that is the operating start time of the score calculation target device, and an operating end time of the associated device is subsequent to the other time period $\Delta t$ having a center time that is the operating end time of the score calculation target device.

The internal overlapping is one of the following states (i) to (iii). (i) One of the internal overlapping states is a state where an operating start time of the associated device is within the range of the time period $\Delta t$ having a center time that is the operating start time of the score calculation target device, and an operating end time of the associated device is within the other time period $\Delta t$ having a center time that is the operating end time of the score calculation target device. (ii) Another internal overlapping state is a state where an operating start time of the associated device is subsequent to the range of the time period $\Delta t$ having a center time that is the operating start time of the score calculation target device, and an operating end time of the associated device is within the other time period $\Delta t$ having a center time that is the operating end time of the score calculation target device. (iii) The last internal overlapping state is a state where an operating start time of the associated device is within the range of the time period $\Delta t$ having a center time that is the operating start time of the score calculation target device, and an operating end time of the associated device is prior to the other time period $\Delta t$ having a center time that is the operating end time of the score calculation target device.

The external overlapping is a state where an operating start time of the associated device is prior to the range of the time period $\Delta t$ having a center time that is the operating start time of the score calculation target device, and an operating end time of the associated device is subsequent to the other time period $\Delta t$ having a center time that is the operating end time of the score calculation target device.

It should be noted that the time period $\Delta t$ regarding the operating start time may have a time length different from that of the other time period $\Delta t$ regarding the operating end time.

Using the definitions in FIG. 13, results of determining overlapping kinds for the respective section pairs in FIGS. 12A and 12B are shown in FIGS. 14A and 14B, respectively. Items 1401 to 1403 in FIGS. 14A and 14B indicate the same information as those indicated in the items 1201 to 1203 in FIGS. 12A and 12B, respectively. The item 1404 indicates an overlapping kind of each determined section pair. For example, the data having the section number 1 in FIG. 14A indicates that a kind of overlapping between the operating section T1 of the score calculation target device and the operating section R1 of the associated device is a subsequent overlapping state.

The subordinate-superior relationship determination unit 105 determines, based on the overlapping kinds determined at S1104, whether or not each section pair is a conjunction section pair, so as to calculate the number of conjunction section pairs (S1105). Here, the conjunction section pair means a pair of operating sections in which the score calculation target device and the associated device operate in conjunction with each other. The subordinate-superior relationship determination unit 105 determines each section pair determined at S1105 as a conjunction section pair, if a kind of overlapping between the conjunction section pair is "subsequent overlapping", "internal overlapping", or "entire overlapping". As shown in FIG. 14A, if the score calculation target device is a TV, there are conjunction section pairs having the section numbers 1, 3, 4, and 6. Therefore, the number of the conjunction section pairs is 4. Likewise, if the score calculation target device is a reproduction device, there are conjunction section pairs having the section numbers 1, 2, 4, and 5. Therefore, the number of the conjunction section pairs is 4. Each of FIGS. 15A and 15B shows conjunction relationships among the operating sections shown in FIG. 10. FIG. 15A shows conjunction relationships in the case where the score calculation target device is the TV and the associated device is the reproduction device. FIG. 15B shows conjunction relationships in the case where the score calculation target device is the reproduction device and the associated device is the TV. In each graph of FIGS. 15A and 15B, a horizontal axis represents a time, and a vertical axis represents whether or not the electrical device 1005 is operating. According to the vertical axis, ON represents that the electrical device 1005 is operating, and OFF represents that the electrical device 1005 is not operating. In addition, each arrow in the graphs represents a conjunction relationship, and each hatched operating section means an operating section included in a conjunction section pair. Each blank operating section means an operating section not included in any conjunction section pair (hereinafter, referred to as a "non-conjunction operating section"). For example, FIG. 15A shows that the TV operates during the operating section T1 in conjunction with the operating section R1 as a conjunction section pair, operates during the operating section T2 in conjunction with the operating section R2 as a conjunction section pair, operates during the operating section T3 in conjunction with the operating section R3 as a conjunction section pair, and operates during the operating section T4 in conjunction with the operating section R4 as a conjunction section pair. FIG. 15A also shows that there is no non-conjunction operating section. FIG. 15B shows that the reproduction device operates during the operating section R1 in conjunction with the operating section T1 as a conjunction section pair, and also in conjunction with the operation section T2 as another conjunction section pair. FIG. 15B also shows that the reproduction device operates during the operating section R3 in conjunction with the operating section T3 as a conjunction section pair, and also in conjunction with the operation section T4 as another conjunction section pair. FIG. 15B further shows that the operating sections R2 and R4 are non-conjunction operating sections.

Referring back to the flowchart of FIG. 11, the subordinate-superior relationship determination unit 105 extracts operating sections (non-conjunction operating sections) not included in any of the conjunction section pairs determined at S1105, and thereby calculates the number of the non-conjunction operating sections (S1106). For example, if the score calculation target device is the TV, there is no non-conjunction operating section as shown in FIG. 15A. Therefore, the number of non-conjunction operating sections is 0. On the other hand, if the score calculation target device is the reproduction device, as shown in FIG. 15B, the operating sections R2 and R4 of the reproduction device are not included in any conjunction section pairs although each of them overlaps an operating section of the TV. Therefore, the number of non-conjunction operating sections is 2 in the case where the score calculation target device is the reproduction device.

The subordinate-superior relationship determination unit 105 calculates a superior device score for the score calculation target device, by using the number of conjunction section pairs calculated at S1105 and the number of non-conjunction operating sections calculated at S1106 (S1107). In more detail, the superior device score is calculated by subtracting (a) a value obtained by multiplying the number of non-conjunction operating sections by $\beta$ from (b) a value obtained by multiplying the number of conjunction section pairs by $\alpha$. Here, $\alpha$ and $\beta$ are positive real numbers. For example, if each of $\alpha$ and $\beta$ is 1.0, a superior device score of the TV is 4.0 (=1.0×(4−0)) and a superior device score of the reproduction device is 2.0 (=1.0×(4−2)). The calculated superior device scores are stored into the device relationship storage unit 106, for example.

FIG. 16 shows an example of the conjunction device data stored in the device relationship storage unit 106. The conjunction device data includes items 1601 to 1605. The items 1601 to 1603 indicate the same information as those indicated in the items 901 to 903 in FIG. 9, respectively. The item 1604 indicates a superior device score in the case where the electrical device 1005 indicated in the item 1602 is a score calculation target device. The item 1605 indicates a superior device score in the case where the electrical device 1005 indicated in the item 1603 is a score calculation target device.

Referring back to the flowchart of FIG. 11, the subordinate-superior relationship determination unit 105 determines whether or not a superior device score has been calculated for every score calculation target device (S1108). If there is any score calculation target device for which a superior device score has not yet been calculated (NO at S1108), the subordinate-superior relationship determination unit 105 performs the steps S1102 to S1107 for the score calculation target device, thereby calculating a superior device score for the target device (S1102 to S1107).

On the other hand, if a superior device score has been calculated for every score calculation target device (YES at S1108), then the subordinate-superior relationship determination unit 105 determines a subordinate-superior relationship for a target conjunction device combination (S1109). In more detail, the subordinate-superior relationship determination unit 105 compares superior device scores between the conjunction electrical devices 1005 in the target conjunction device combination. Thereby, the subordinate-superior relationship determination unit 105 determines a device having a greater superior device score from the conjunction devices as being a superior device, and determines the other device having a smaller superior device score from the conjunction devices as being a sub device. In the case of the conjunction device combination having the conjunction combination number 1 in FIG. 16, the TV indicated as the electrical device 1 has a superior device score greater than that of the reproduction device indicated as the electrical device 2. Therefore, the subordinate-superior relationship determination unit 105 determines that the TV is a superior device and the reproduction device is a sub device. The determination results are added to the conjunction device data in FIG. 16. An example of the data added with the determination results is shown in FIG. 17. The data in FIG. 17 differs from the data in FIG. 16 only in adding an item 1706 indicating a name of a superior device and an item 1707 indicating a name of a sub device.

Referring back to the flowchart of FIG. 11, the subordinate-superior relationship determination unit 105 determines whether or not a subordinate-superior relationship has already been determined for every conjunction device combination (S1110). If a subordinate-superior relationship has already been determined for every conjunction device combination (YES at S1110), the subordinate-superior relationship determination unit 105 completes the processing for subordinate-superior relationship determination. On the other hand, if there is any conjunction device combination for which a subordinate-superior relationship has not yet been determined (NO at S1110), the subordinate-superior relationship determination is made for the conjunction device combination (S1101 to S1109).

Next, the energy saving support is described with reference to a flowchart of FIG. 5.

In the embodiment, as the energy saving support, a device forgotten to be powered OFF is determined, and then the user is informed of the device or the device is automatically powered OFF. In addition, the energy saving support uses the data generated in the subordinate-superior relationship determination. It is therefore assumed that the energy saving support described later is executed after the subordinate-superior relationship determination described earlier with reference to FIGS. 4, 7, and 11.

The electricity consumption receiving unit 102 receives pieces of electricity consumption data of the respective electrical devices 1005 from the respective electricity consumption measuring devices 1001 provided to the electrical devices 1005 (S501).

The electricity consumption receiving unit 102 stores the receives electricity consumption data of the respective electrical devices 1005 to the electricity consumption history storage unit 103 (S502).

It is also possible that the step of receiving electricity consumption data (S501) and the step of storing the electricity consumption data (S502) are always performed and the following steps may be performed as needed.

The determination at steps S503 to 508 as to whether or not a device has been forgotten to be powered OFF is performed by the power-off forgetting determination unit 107.

The power-off forgetting determination unit 107 extracts electrical devices 1005 that are currently operating, from pieces of the electricity consumption data stored in the electricity consumption history storage unit 103 (S503). The determination as to whether or not each device is operating uses the same method as previously described at S701.

Based on the conjunction device data stored in the device relationship storage unit 106, the power-off forgetting determination unit 107 extracts only sub devices from the currently-operating electrical devices 1005 extracted at S503 (S504). For example, by comparing the items 1707 in FIG. 17 to the currently-operating electrical devices 1005, only sub devices registered in the items 1707 are extracted from the currently-operating electrical devices 1005.

The power-off forgetting determination unit 107 selects a target device for power-off forgetting determination from the sub devices extracted at S504 (S505). For example, it is assumed that the reproduction device having the conjunction combination number 1 in FIG. 17 is selected as a target device for the power-off forgetting determination.

Under the assumption, the power-off forgetting determination unit 107 extracts electricity consumption data of a superior device of the target electrical device 1005 from the electricity consumption history storage unit 103, and thereby determines whether or not the superior device is currently operating (S506). If the superior device is not operating (Not Operating at S506), then the power-off forgetting determination unit 107 determines that the target electrical device 1005 has been forgotten to be powered OFF, and registers the target device as a target for the energy saving support (S507).

On the other hand, if the superior device is operating (Operating at S506), then the power-off forgetting determination unit 107 determines whether or not power-off forgetting determination has already been made for every sub device (electrical device 1005) extracted at S504 (S508). If there is any electrical device 1005 for which power-off forgetting determination has not yet been made (NO at S508), then steps after S504 are repeated.

On the other hand, if power-off forgetting determination has already been made for every sub device (YES at S508), the power-off forgetting determination unit 107 determines whether or not there is any electrical device 1005 determined as having been forgotten to be powered OFF after making the power-off forgetting determination for all target electrical devices 1005 (S509). If there is any electrical device 1005 determined as having been forgotten to be powered OFF (YES at S509), then the energy saving support execution unit 108 executes the energy saving support for the electrical device 1005 (S510). On the other hand, if there is no electrical device 1005 determined as having been forgotten to be powered OFF (NO at S509), then the power-off forgetting determination unit 107 and the energy saving support execution unit 108 completes the processing.

Figure 18A:
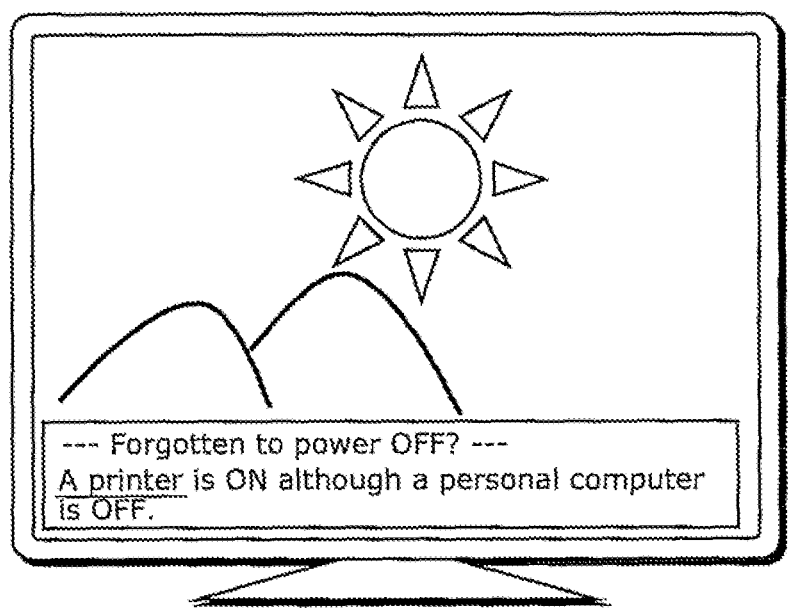
FIG. 18A is a diagram showing an example of a display screen for displaying energy saving support generated by an energy saving support execution unit.
Figure 18B:
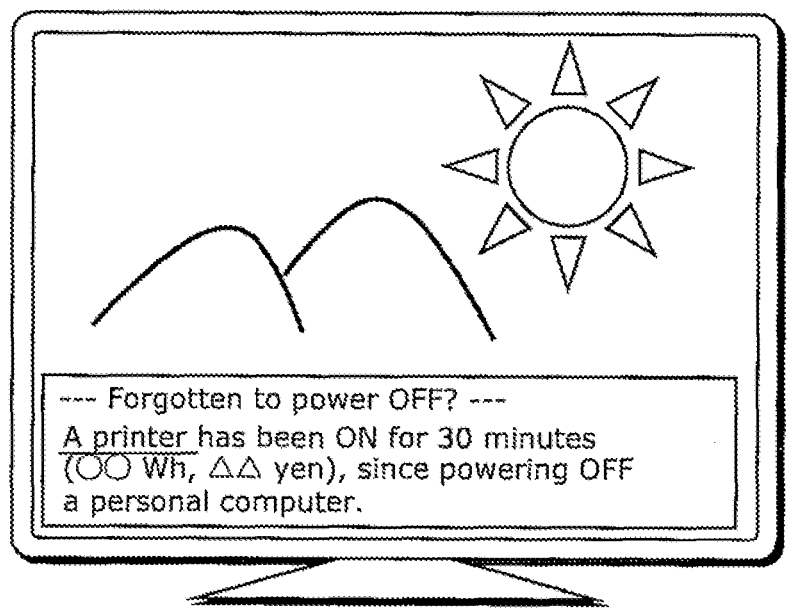
FIG. 18B is a diagram showing another example of a display screen for displaying energy saving support generated by the energy saving support execution unit.

It should be noted that, as actual energy saving support, for example, the energy saving support execution unit 108 may transmit a signal to the device determined as having been forgotten to be powered OFF in order to power OFF the device. It should also be noted that, as another support method, the energy saving support execution unit 108 may notify, for example by mail, the user of information for supporting energy saving of the electrical device 1005 determined as having been forgotten to be powered OFF. In addition, the energy saving support execution unit 108 may notify the information to the display device 1006 so that the display device 1006 displays the information. The method of displaying the information by notification may be performed based on the subordinate-superior relationship as shown in FIG. 18A. Or, as shown in FIG. 18B, it is possible to display a time period since power-OFF of the superior device, electricity consumption during the time period, expense of the electricity consumption, and the like, based on the subordinate-superior relationship.

The following explains again an example of the energy saving support by using the data of measuring electricity consumption of the TV and the reproduction device shown in FIG. 1. It is assumed that the TV and the reproduction device have already been determined as a superior device and a sub device, respectively, in the processing performed according to the flowchart of FIG. 4. If it is 10:00 now, FIG. 1 shows that the TV serving as the superior device is operating. Therefore, it is determined that the superior device is operating (Operating at S506), and the processing proceeds to S508 and then S509. Then, since there is no electrical device 1005 determined as having been forgotten to be powered OFF, the support is not executed. On the other hand, if it is 12:00 now, the TV serving as the superior device is not operating, while the reproduction device serving as the sub device is operating. Therefore, it is determined that the superior device is not operating (Not Operating at S506), and that the reproduction device has been forgotten to be powered OFF and should be a target of energy saving support (S507). Since there is a device forgotten to be powered OFF (YES at S509), then the above-described energy saving support is executed (S510).

It should be noted that notification or presentation of the information for supporting energy saving (hereinafter, referred to as "energy saving support information") for a device forgotten to be powered OFF may be performed at a timing of determining that the device have been forgotten to be powered OFF, or at a timing of having been detecting the forgotten state over a predetermined time period. In addition, the notification or presentation may be performed at a timing where electricity consumption or expense of the electricity consumption exceeds a predetermined value.

It is also possible to control the timing for the notification or presentation, depending on the electrical device 1005 determined as having been forgotten to be powered OFF. For example, an immediate notification degree is predetermined for each of the electrical devices 1005 for each of which electricity consumption is measured. Furthermore, a shorter time period from determination of the forgotten state to notification or presentation of the energy saving support information is set for an electrical device 1005 having a higher immediate notification degree. The immediate notification degree may be set higher for an electrical device 1005 having a higher possibility of causing fire due to forgetting to power OFF. It is also possible to set a higher immediate notification degree for an electrical device 1005 having greater electricity consumption.

Moreover, the electrical device 1005 to which the energy saving information is notified (display device 1006) may be changed to another depending on the immediate notification degree. In more detail, if an electrical device 1005 having a higher immediate notification degree is determined as having been forgotten to be powered OFF, the energy saving support execution unit 108 specifies currently-operating electrical devices 1005 from the electricity consumption data. The energy saving support execution unit 108 further specifies, from the currently-operating electrical devices 1005, a display device 1006 or an electrical device 1005 having a loudspeaker in order to cause it to output video or audio. Thereby, the user is notified of the device forgotten to be powered OFF.

As described above, the electric power control support device according to the embodiment determines a subordinate-superior relationship between electrical devices 1005 based on operation histories of the electrical devices 1005. In addition, the electric power control support device according to the embodiment specifies a device forgotten to be powered OFF based on the subordinate-superior relationship, and thereby executes energy saving support for the specified device. More specifically, if a superior device is OFF and a sub device is ON, it is determined that the sub device has been forgotten to be powered OFF. It is therefore possible to execute energy saving support to reduce electricity consumption resulting from temporal and also chronic forgetting of powering OFF. As a result, an electric power control support device having a high execution efficiency of energy saving for electrical devices can be provided.

In addition, the energy saving support can be performed using a value of electricity consumption. Therefore, only by providing the electricity consumption measuring device 1001 to the electrical device 1005, it is possible to support energy saving. The energy saving support can be performed for various electrical devices 1005 in home regardless of production years and months or manufacturers.

It should be noted that it has been described in the embodiment that conjunction device combinations are extracted from all electrical devices 1005 existing in home. However, a household power source is commonly allocated into a plurality of power source breakers (current limiters). In consideration of the circumstances, it is also possible to restrict the conjunction device specification by using information of device groups related to power supply. For example, power source breakers are generally allocated to respective rooms. The conjunction device specification unit 104 therefore performs the conjunction device specification for electrical devices 1005 receiving power from a target power source breaker. In other words, the conjunction device specification unit 104 does not perform the conjunction device specification for electrical devices 1005 receiving power from the other power source breakers except the target power source breaker.

In recent years, with the increase of electrical devices 1005 in home, power strips appear on market to provide power to many electrical devices from a single electrical outlet. Especially, a personal computer has Universal Serial Bus (USB) terminals and the like to which many peripheral devices can be connected. Such peripheral devices often need power supply via AC adaptors and the like. As a result, in general, many peripheral devices of a personal computer are connected to a single power strip. In the above case, the conjunction device specification unit 104 may perform the conjunction device specification for electrical devices 1005 for each power strip. In other words, the conjunction device specification unit 104 does not perform the conjunction device specification for electrical devices 1005 connected to other power strips except a target power strip. As described above, a target range for the conjunction device specification is limited by using information of device groups related to power supply, thereby performing the conjunction device specification with a higher accuracy.

It should be noted that it has been described in the embodiment that operating sections overlapping each other are extracted as shown in FIG. 8 in order to specify conjunction device combinations. It is possible to consider also time zones of the operating sections to specify the conjunction device combinations. Thereby, the conjunction device specification can be performed more efficiently. Especially, two electrical devices 1005 often operate in conjunction with each other when a person living in the house operates the electrical devices 1005. It is therefore possible to determine that a plurality of electrical devices 1005 operate in conjunction with each other when overlapping operating sections are extracted in a time zone where the user is at home. It is also possible to determine whether or not the user is at home based on schedule information in a Personal Digital Assistant (PDA) or a mobile telephone of the user.

It should also be noted that it has been described in the embodiment that a subordinate-superior relationship between electrical devices 1005 is determined based on electricity consumption histories. Here, a superior device is generally a device, such as a TV or a display device of a personal computer, which displays or presents contents directly to the user. On the other hand, in general, there are many sub electrical devices 1005 for such a superior electrical device 1005 related to display, and connections of the sub electrical devices 1005 are often changed. Therefore, every time such a connection is changed, an accuracy of the subordinate-superior relationship determination is decreased. In order to solve the problem, it is also possible that the user designates a superior display device and the system automatically detects devices that depend on the superior device, so that an accuracy of the subordinate-superior relationship determination is enhanced.

It should also be noted that it has been described in the embodiment that the energy saving support is performed for electrical devices 1005 by determining a subordinate-superior relationship between the electrical devices 1005 based on electricity consumption. However, data used for the subordinate-superior relationship determination is not limited to electricity consumption. For example, it Is also possible to use consumption current to determine a subordinate-superior relationship. It is further possible to perform the subordinate-superior relationship determination based on information indicating whether or not each electrical device 1005 is operating (namely, whether each electrical device 1005 is ON or OFF).

It should also be noted that electrical devices 1005, which is kept operating like a refrigerator, may be eliminated from target electrical devices 1005 for the subordinate-superior relationship determination, in order not to receive energy saving support.

It should also be noted that the conjunction device specification unit 104 may not be always provided, and that conjunction device combinations may be predetermined.

(First Variation)

In the previously-described embodiment, the processing performed by the power-off forgetting determination unit 107 to determine a device forgotten to be powered OFF is performed based on subordinate-superior relationships determined by the subordinate-superior relationship determination unit 105. It is also possible to provide the user with an interface allowing the user to edit the subordinate-superior relationships determined by the subordinate-superior relationship determination unit 105, so that the processing performed by the power-off forgetting determination unit 107 to determine a device forgotten to be powered OFF is performed based on results of user's confirmation and edition. In more detail, the conjunction device data stored in the device relationship storage unit 106 is presented to the user, and an interface is provided to the user to allow the user to edit the conjunction device data. An example of the interface is shown in FIG. 19. FIG. 19 shows a list of conjunction device combinations registered in the device relationship storage unit 106, and "edit" buttons for the respective combinations. When the user intends to correct any conjunction device combination or a subordinate-superior relationship in any combination, the user presses a corresponding "edit" button to delete the combination or change the devices. The changed results are stored as a piece of conjunction device data into the device relationship storage unit 106, and are later used by the power-off forgetting determination unit 107 to determine any device forgotten to be powered OFF.

It should be noted that an order of the conjunction device combinations in the list displayed on the interface allowing the user to edit the combinations may be determined based on the respective ratios regarding overlapping sections which are calculated at S704, or on the superior device scores calculated at S1109 for the respective combinations to be used in subordinate-superior relationship determination. For example, when the overlapping section ratio is small, or when a difference between the superior device scores in a conjunction device combination which is used in the subordinate-superior relationship determination is small, there is a possibility that the conjunction device combination specification or the subordinate-superior relationship determination is wrong for the combination. Therefore, it is possible that a conjunction device combination having a smaller value of such data is displayed higher in the list, which allows the user to easily correct the combination or a relationship of the combination.

(Second Variation)

Figure 5:
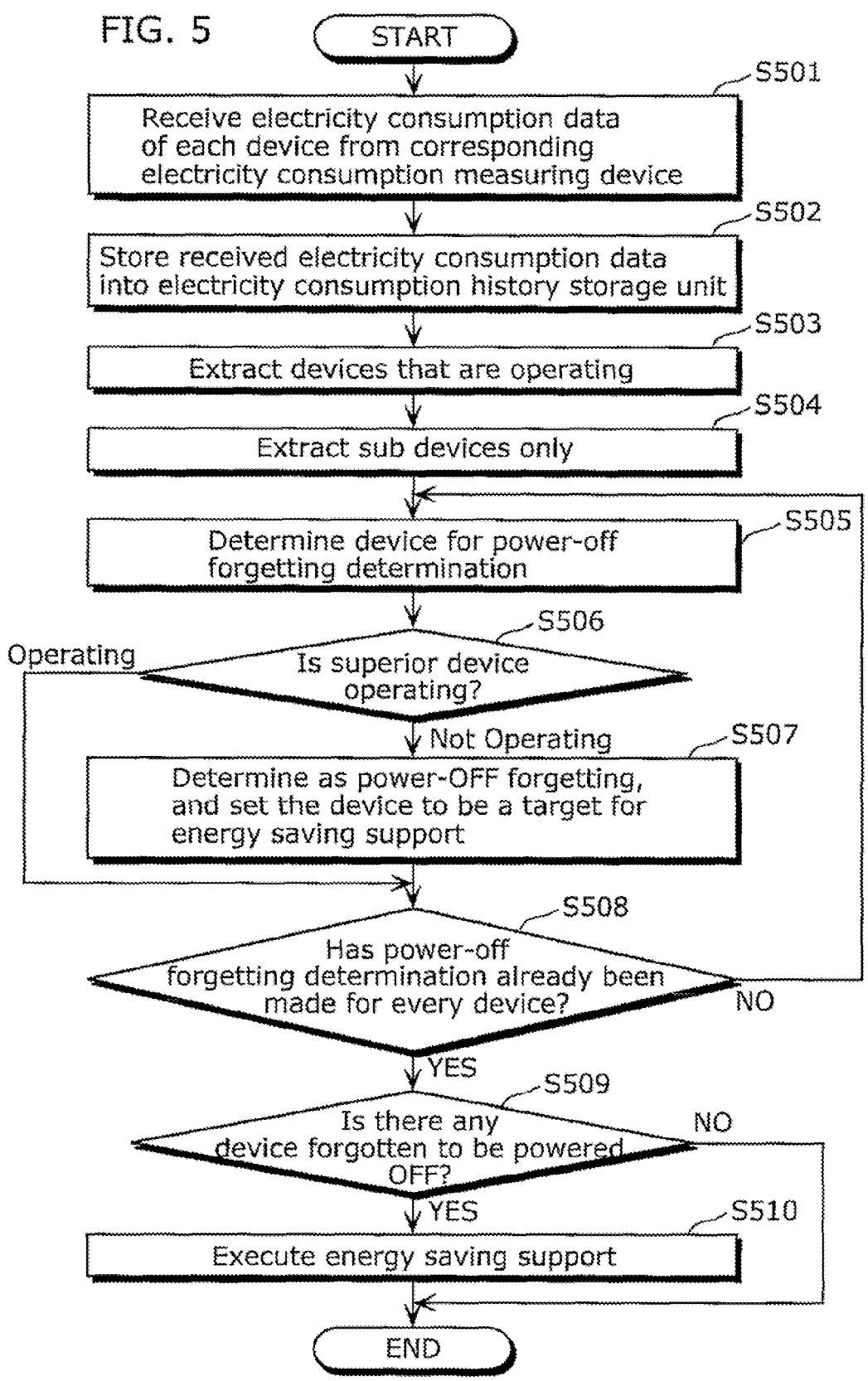
FIG. 5 is a flowchart of processing for executing energy saving support by using the subordinate-superior relationships among devices.

In the previously-described embodiment, in the processing performed by the energy saving support execution unit 108 in the flowchart of FIG. 5, a device forgotten to be powered OFF is extracted from currently-operating devices. Furthermore, the energy saving support execution unit 108 provides the user with energy saving support, by powering OFF the device forgotten to be powered OFF, or by notifying the user of the forgotten device. In addition to such energy saving support, it is also possible to execute another energy saving support based on the power-off forgetting determination, by using electricity consumption data measured during a predetermined time period, for example, for one day, for one week, or for one month.

Figure 20A:
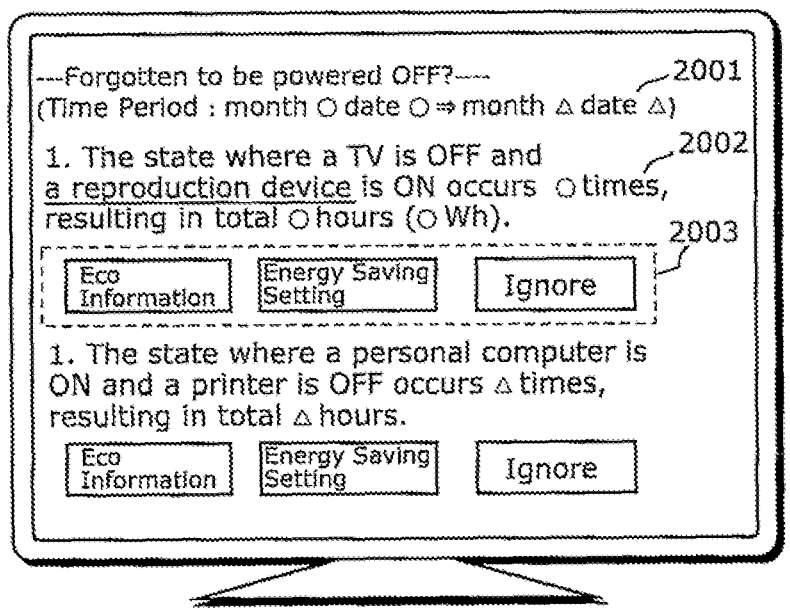
FIG. 20A is a diagram showing an example of a display screen for energy saving support according to a second variation of the embodiment of the present invention.
Figure 20B:
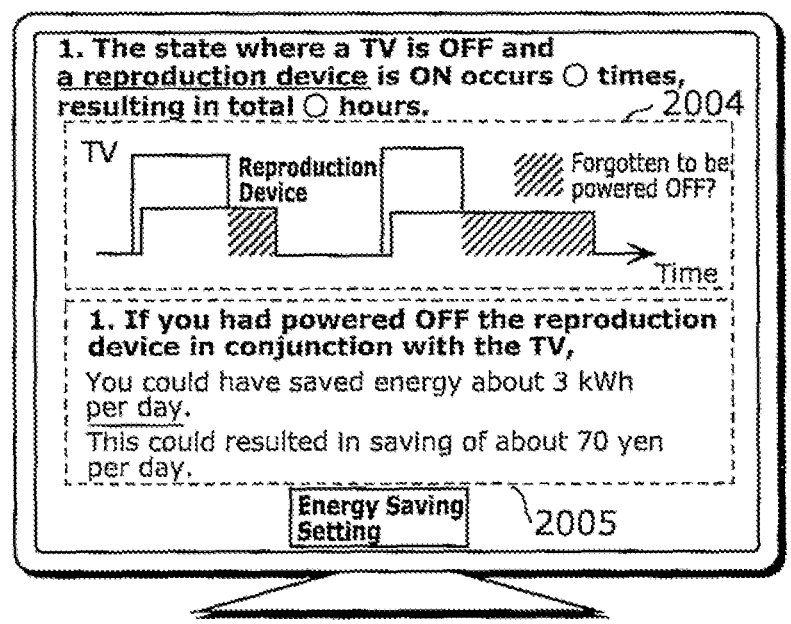
FIG. 20B is a diagram showing an example of a display screen for energy saving support according to a second variation of the embodiment of the present invention.

The processing for executing the energy saving support based on data measured for a predetermined time period includes the following steps. In the flowchart of FIG. 5, the energy saving support execution unit 108 obtains electricity consumption data measured during a predetermined time period to extract devices operating during the predetermined time period, instead of extracting currently-operating devices at S503. Then, the energy saving support execution unit 108 performs the power-off forgetting determination in the same manner as described in the previously-described embodiment (S504 to 508). However, the energy saving support execution (S509) according to the second variation differs from that according to the previously-described embodiment. In order to execute energy saving support, the energy saving support execution unit 108 notifies the user of energy saving support information when there is any device forgotten to be powered OFF during a predetermined time period. An example of a notification screen is shown in FIG. 20A. The screen shows a time period 2001 regarding which the power-off forgetting determination OFF is performed, and a result 2002 of the determination. In more detail, FIG. 20A indicates a cause of the forgotten state based on a subordinate-superior relationship, as well as counts and a time period of the forgotten state, electricity consumption during the time period of the forgotten state. The screen also displays buttons 2003 which the user can select. If the user presses an "Eco Information" button among them, a screen as shown in FIG. 20B appears. The screen as shown in FIG. 20B displays information 2004 that is a graph plotting electricity consumption data of a superior device and a sub device in a time zone of the forgotten state. The Information 2004 notifies the user of the forgotten state in more detail. The screen as shown in FIG. 20B also displays information 2005 indicating efficiency of energy saving. The information 2005 includes electric energy that the user could have saved if the user had powered OFF the sub device, and a cost of the electric energy as converted to an electricity expense. In addition to the electrical energy and the electricity expense, the information 2005 may display a carbon-dioxide emission amount which is calculated from the electric energy, and a number of trees necessary to absorb the carbon-dioxide emission amount which is calculated from the electric energy, for example.

It should also be noted that the energy saving support based on the electricity consumption data measured during a predetermined time period according to the second variation may be presented at a timing of receiving a request from the user, or at regular intervals depending on the predetermined time period. Meanwhile, in the case of supporting energy saving for Audio/Visual (AV)-related devices including TVs, a TV broadcast program schedule is generally changed every three months in Japan. Therefore, a user's life style would be also changed every three months. It is therefore possible to execute energy saving support or obtain electricity consumption data necessary for the energy saving support, every week in consideration of a unit of three months starting from April, for example. For a new unit of three months, data previously generated in the last week may not be used because the user's life style would be changed. As described above, for the AV-related devices, the time period is set depending on a cycle of changing broadcast program schedules, so that a subordinate-superior relationship can be extracted with a high accuracy.

In the energy saving support based on electricity consumption data measured during the predetermined time period according to the second variation of the embodiment, it is also possible to detect not the power-off forgotten state, but also standby power, in order to support energy saving. More specifically, when it is determined that a sub device in a subordinate-superior relationship consumes standby power although its superior device is OFF, it is possible to present the user with standby power reduction effects that could have been produced if the user had pulled out a plug of the sub device from an electrical outlet.

(Third Variation)

In the third variation of the embodiment, the method of presenting saving support information according to the second variation is changed. More specifically, the energy saving support execution unit 108 stores energy saving support information presented to the user, and a date and a time of the presentation, into the electricity consumption history storage unit 103 as energy saving support presentation information. When certain energy saving support information is to be presented to the user, the energy saving support execution unit 108 refers to a history of past presentation. If the same information presentation has been performed, then the energy saving support execution unit 108 determines that the presentation has not caused the user to perform any energy saving actions. Based on the determination, the energy saving support execution unit 108 makes a change in the energy saving support information in order to more interest the user.

FIG. 21 shows an example of the history (the energy saving support presentation information) stored in the electricity consumption history storage unit 103. The energy saving support presentation information includes items 2101 to 2106. The item 2101 indicates a date and time at which corresponding energy saving support information is presented. The item 2102 indicates a time period for measuring electricity consumption to generate the presented energy saving support information. The items 2103 and 2104 indicate a superior device and a sub device, respectively, in a subordinate-superior relationship indicated in the presentation. The item 2105 indicates counts of determining forgotten sates, and a total consumed electric energy of the sub device determined as having being forgotten to be powered OFF. The item 2106 indicates kinds, amounts, and units of the amounts regarding pieces of presented details in the energy saving support information. Each amount indicated in the item 2106 is calculated from the measurement time period in the item 2102 and the total electricity consumption in the item 2105, and eventually presented by the unit in the item 2106. In the example of FIG. 21, since the unit is one day, a consumed electric energy of 3 kWh per day and an electricity expense of 70 yen per day are registered as pieces of presented details.

Figure 22:
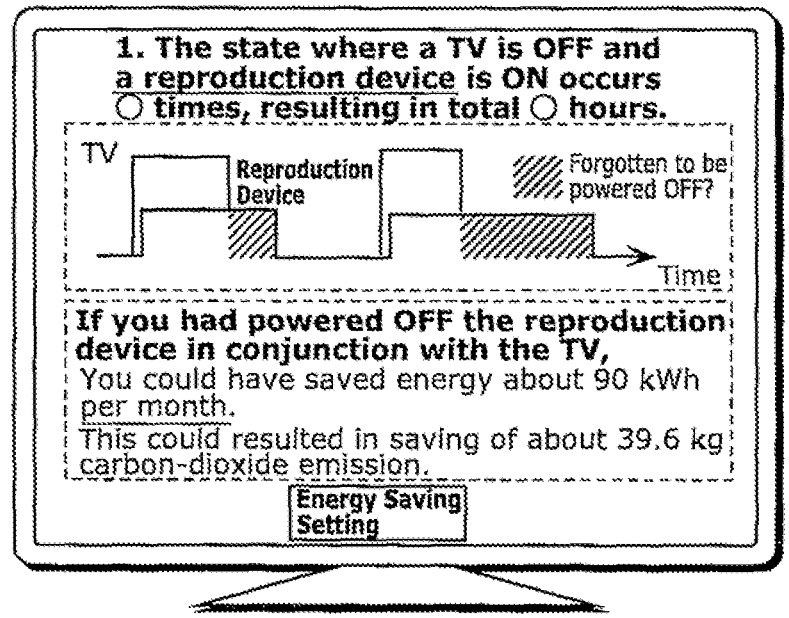
FIG. 22 is a diagram showing an example of a display screen for energy saving support according to the third variation of the embodiment of the present invention.

When certain energy saving support information is to be currently presented, the energy saving support execution unit 108 determines whether or not the same support has already been executed, with reference to the history data of the energy saving support presentation information. Here, it is determined that the same support has been executed, if the history data includes any similar energy saving support information that is similar to current energy saving support information intended to be currently presented. Here, (a) the similar energy saving support information has the same superior and sub devices in the items 2103 and 2104, and (b) presented details in the item 2106 of the similar energy saving support information has a difference equal to or less than a predetermined value in comparison to that of the current energy saving support information. If the determination is made that the same support has already been executed, the energy saving support execution unit 108 changes kinds of presented details in the current energy saving support information to generate new energy saving support information to be presented to the user. More specifically, if the similar energy saving support information includes consumed electric energy and an electricity expense as kinds of presented details, the new energy saving support information may include, as presented details, consumed electricity energy, a carbon-dioxide emission amount corresponding to the electricity consumption, and a number of trees necessary to absorb the carbon-dioxide emission amount which corresponds to the electricity consumption. Furthermore, the units not the kinds of the presented details may be changed. For example, the unit may be changed from one day to one week or one month, so as to calculate a presented amount. FIG. 22 shows a screen example on which the energy saving support information shown in FIG. 20B is changed to new energy saving support information by changing kinds and units of the presented details.

(Fourth Variation)

Figure 23:
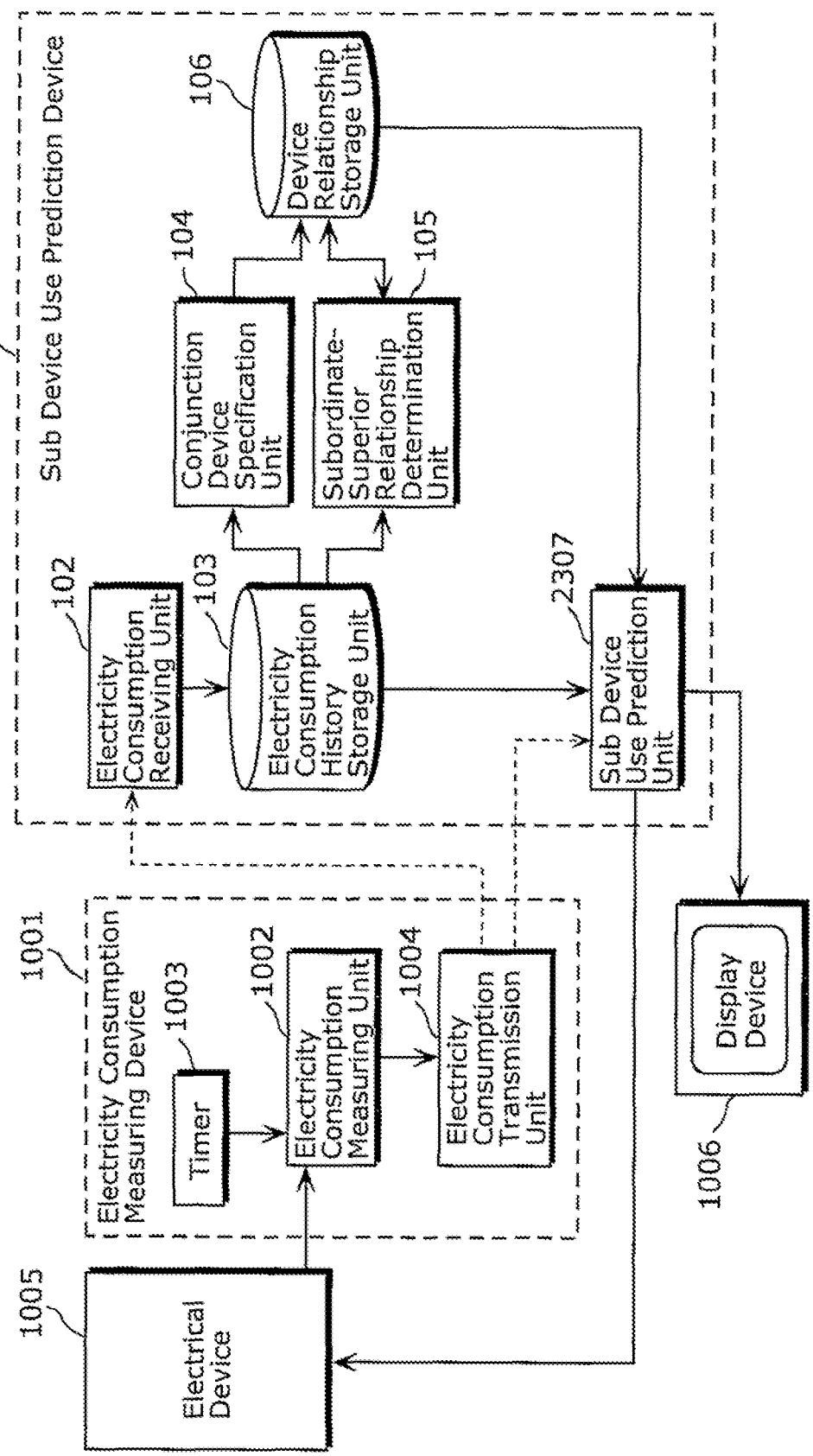
FIG. 23 is a block diagram showing functional structures of an electricity consumption measuring device and a sub device use prediction device which are included in an energy saving support system according to a fourth variation of the embodiment of the present invention.

In the above embodiment and the first and second variations, the power-off forgetting determination is made based on a subordinate-superior relationship between devices, and electric power control or information presentation is performed using the determination results. In the fourth variation of the embodiment, however, a use of a sub device is predicted based on the same subordinate-superior relationship between devices which is generated by the subordinate-superior relationship determination unit 105 and stored into the device relationship storage unit 106, and electric power control or information presentation is performed using the prediction results. The fourth variation is conceived under the observation that there is a high probability in a subordinate-superior relationship that a sub device starts operating within a time period in which a superior device is operating. A energy saving support system according to the fourth variation differs from the energy saving support system according to the embodiment in that the electric power control support device 101 shown in FIG. 2 is replaced by a sub device use prediction device. FIG. 23 is a block diagram showing functional structures of the electricity consumption measuring device 1001 and the sub device use prediction device 2301 which are included in the energy saving support system according to the fourth variation. The sub device use prediction device 2301 differs from the electric power control support device 101 shown in FIG. 3 in that the power-off forgetting determination unit 107 and the energy saving support execution unit 108 are replaced by a sub device use prediction unit 2307.

Figure 24:
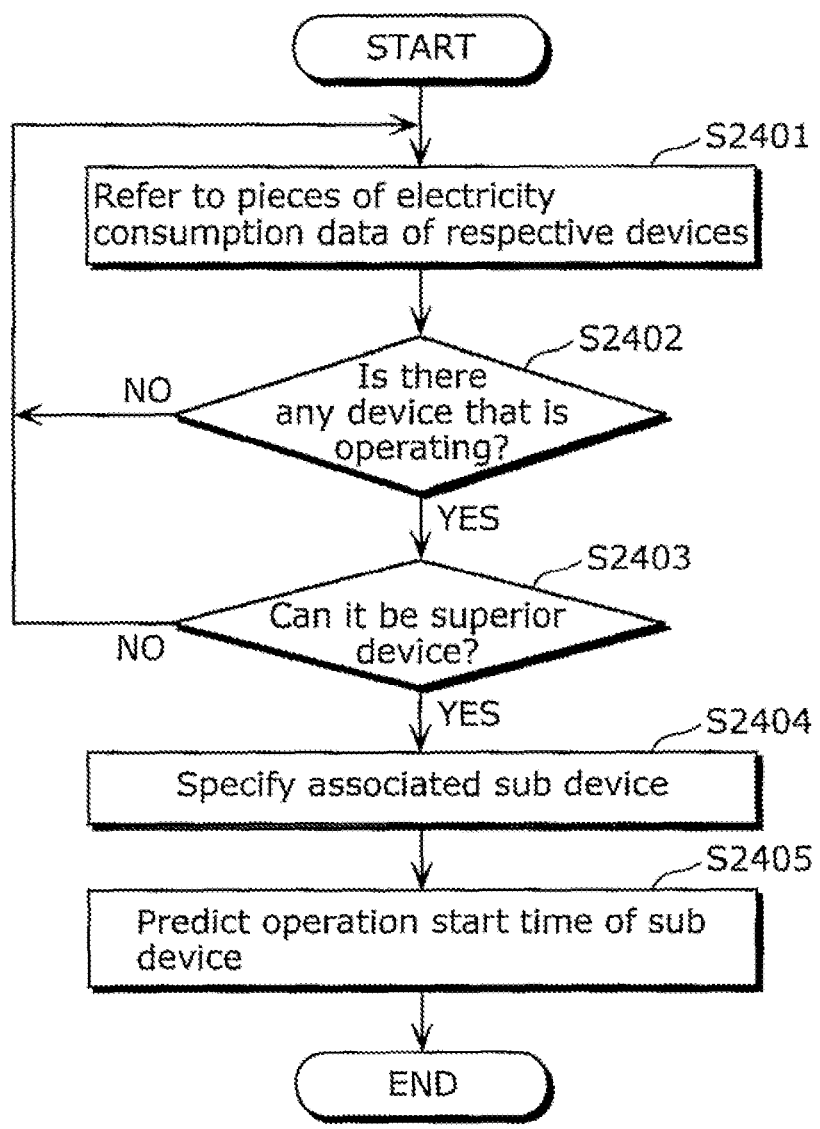
FIG. 24 is a flowchart of processing performed by a sub device use prediction unit to predict use of sub device.

The processing performed by the sub device use prediction unit 2307 to predict use of sub devices is described with reference to a flowchart of FIG. 24.

The sub device use prediction unit 2307 refers to the pieces of electricity consumption data of the respective electrical devices 1005 which are received by the electricity consumption receiving unit 102 at predetermined time intervals and then stored into the electricity consumption history storage unit 103 (S2301).

The sub device use prediction unit 2307 determines whether or not there is any device starting operation, based on the pieces of electricity consumption data of the respective devices referred to at S2301 (S2302). For example, the sub device use prediction unit 2307 may determine that a device starts operating, if a difference between (a) a value of electricity consumption referred to last time for the device and (b) a value of electricity consumption referred to present time for the device is equal to or greater than a predetermined value. It is also possible to determine that a device starts operation, if a value of electricity consumption referred to last time for the device is equal to or less than the predetermined value, and (b) a value of electricity consumption referred to present time for the device is equal to or greater than the predetermined value. If the determination is made that there is no device starting operation (No at S2302), then the processing is performed again from S2301.

On the other hand, if it is determined that there is a device starting operation (YES at S2302), then the sub device use prediction unit 2307, with reference to the conjunction device data stored in the device relationship storage unit 106, further determines whether or not the device determined at S2302 as starting operation at has a subordinate-superior relationship with another device and serves as a superior device In the relationship (S2303). If it is determined that the device does not have any subordinate-superior relationship, or if it is determined that the device has a subordinate-superior relationship but must be a sub device in the relationship (NO at S2303), then the processing is performed again from S2301.

On the other hand, if the device determined as starting operation can be a superior device (YES at S2303), then the sub device use prediction unit 2307, with reference to the conjunction device data stored in the device relationship storage unit 106, specifies a sub device associated with the device (superior device) determined as starting operation (S2304).

The sub device use prediction unit 2307 predicts a time where the sub device specified at S2304 starts operating (hereinafter, referred to as an "operation start time") (S2305). Here, the operation start time to be predicted at this step is after the superior device starts operating and before a use of the superior device ends. In the simplest way, the sub device use prediction unit 2307 may predict, as the operation start time of the sub device, a time of detecting that the superior device starts operating. It is also possible that the subordinate-superior relationship determination unit 105 stores, in the device relationship storage unit 106, a delay time period that is a predicted time period from (a) the operation start time of the superior device to (b) the operation start time of the sub device, in order to be used in determining the overlapping state at S1104 in FIG. 11. For example, the device relationship storage unit 106 stores, for each conjunction device combination, an average value of a delay time period in association with a determined subordinate-superior relationship. The sub device use prediction unit 2307 may predict, as the operation start time of the sub device, a time after the average value of the delay time period that would pass since the determined operation start time of the superior device. Furthermore, the sub device use prediction unit 2307 may predict an operating time zone, not the operation start time. More specifically, the sub device use prediction unit 2307 may predict, as an operating time zone of the sub device, a time period that is a predetermined time period that would pass since the predicted operation start time of the sub device. It should be noted that the predetermined time period may be predetermined by a designer of the sub device use prediction device 2301, or may be an average operating time period of the superior device associated with the sub device.

The sub device use prediction unit 2307 performs electric power control or information presentation based on the prediction results such as the predicted operation start time or operating time zone of the sub device.

In the electric power control, for example, the sub device use prediction unit 2307 does not supply power to an electrical device 1005 (the sub device) when the sub device is not used, and supplies power to the electrical device 1005 (sub device) only in the predicted operating time zone. As a result, wasted standby power can be reduced.

Figure 25:
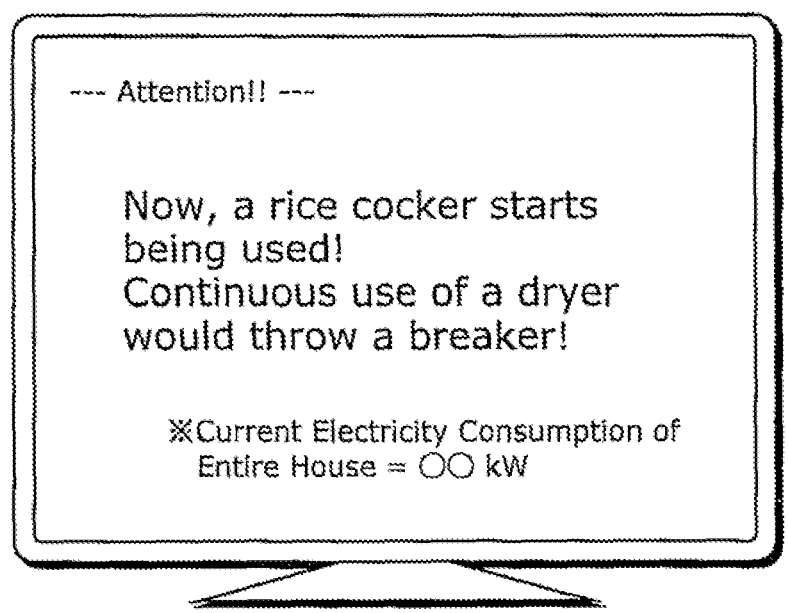
FIG. 25 is a diagram showing an example of a display screen generated by the sub device use prediction unit.

In addition, at S2301, the sub device use prediction unit 2307 may calculate total electricity consumption of all devices when the pieces of electricity consumption data of the devices are referred to. Then, based on the total electricity consumption and the prediction result regarding the operation start of the sub device, the sub device use prediction unit 2307 may provide information related to electricity consumption to the display device 1006. More specifically, when the sub device use prediction unit 2307 determines that a sum of (a) the total electricity consumption of all devices related to a timing where a superior device starts operating, and (a) predicted electricity consumption of the sub device having a high possibility of operating depending on the operation start of the superior device is greater than a predetermined value, the sub device use prediction unit 2307 may cause the display device 1006 to display warning of the determination result on a screen as shown in FIG. 25. In the example shown in FIG. 25, the superior device is a rice cooker and the sub device is a dryer. The above processing can prevent that a breaker is thrown due to supply of power exceeding preset available power amount in home.

It should be noted that the predicted electricity consumption of the sub device may be calculated from a history of already-predicted electricity consumption. More specifically, an average of electricity consumption at power-ON is calculated for each device and then stored, and the average is used as predicted electricity consumption of a sub device. It is also possible to provide the electricity consumption measuring device 1001 on a distribution board in order to detect total electricity consumption of all devices, instead of calculating the total electricity consumption as described in the above example.

Figure 26:
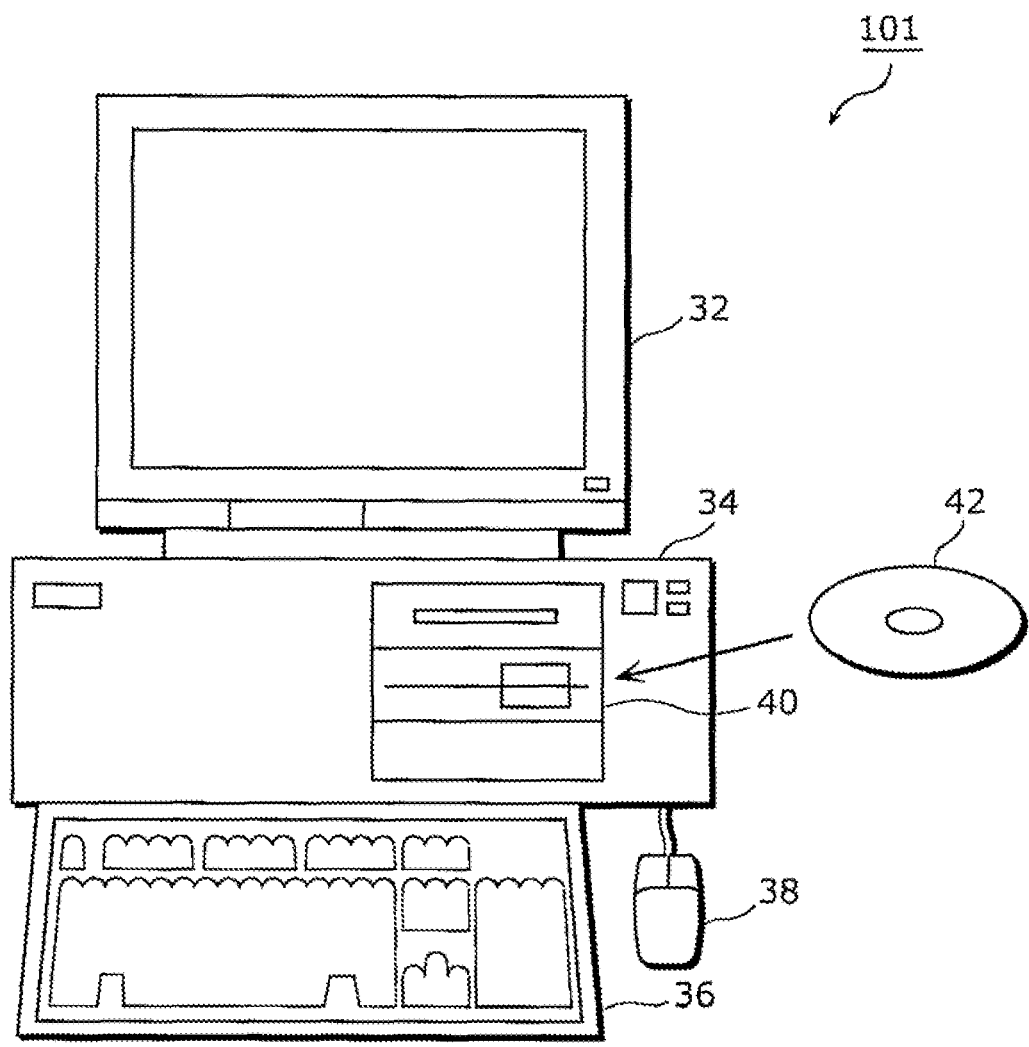
FIG. 26 is an external view of an electric power control support device implemented as a computer.

It should be noted that the electric power control support device 101 described in the embodiment and its variations may be implemented as a computer. FIG. 26 is an external view of the electric power control support device 101. The electric power control support device 101 includes a computer 34; a keyboard 36 and a mouse 38 which are used to give instructions to the computer 34; a display 32 for presenting information such as operation results of the computer 34; a Compact Disc-Read Only Memory (CD-ROM) device 40 for reading a program executed by the computer 34; and a communication modem (not shown).

The computer program for executing the energy saving support is stored in the computer-readable medium CD-ROM 42, and read by the CD-ROM device 40. Or, the computer program is read by the communication modem via a computer network 26.

Figure 27:
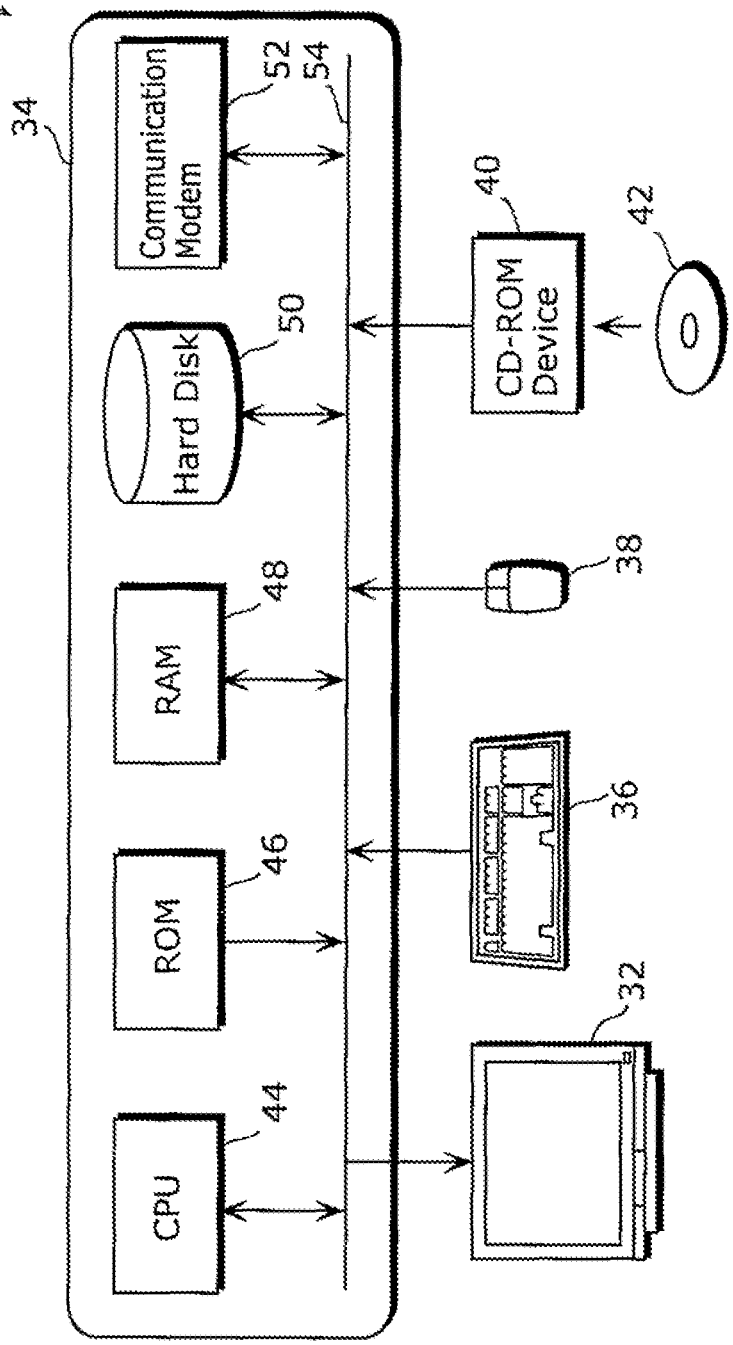
FIG. 27 is a block diagram showing a hardware structure of the electric power control support device implemented as a computer.

FIG. 27 is a block diagram showing a hardware structure of the electric power control support device 101. The computer 34 includes a Central Processing Unit (CPU) 44, a Read Only Memory (ROM) 46, a Random Access Memory (RAM) 48, a hard disk 50, a communication modem 52, and a bus 54.

The CPU 44 executes the computer program that is read via the CD-ROM device 40 or the communication modem 52. The ROM 46 stores computer programs and data required to operate the computer 34. The RAM 48 stores data such as parameters used in executing the computer programs. The hard disk 50 stores the computer programs, data, and the like. The communication modem 52 communicates with other computers via the computer network 26. The bus 54 connects the CPU 44, the ROM 46, the RAM 48, the hard disk 50, the communication modem 52, the display 32, the keyboard 36, the mouse 38, and the CD-ROM device 40 to one another. The computer program executed by the CPU 44 is a program for the processing shown by the flowcharts of FIGS. 4, 5, 7, and 11. Furthermore, data stored in the electricity consumption history storage unit 103 and the device relationship storage unit 106 is stored in the RAM 48 or the hard disk 50.

Moreover, the sub device use prediction device 2301 may be implemented as a computer likewise the electric power control support device 101.

It should be noted that a part or all of the structural elements included in each of the above devices may be implemented into a single Large Scale Integration (LSI). The system LSI is a super multi-function LSI that is a single chip into which a plurality of structural elements are integrated. More specifically, the system LSI is a computer system including a microprocessor, a ROM, a RAM, and the like. The RAM holds a computer program. The microprocessor executes the computer program to cause the system LSI to perform its functions.

It should also be noted that a part or all of the structural elements included in each of the above devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor executes the computer program to cause the IC card or the module to perform its functions. The IC card or the module may have tamper resistance.

It should also be noted that the present invention may be the above-described method. The present invention may be a computer program causing a computer to execute the method, or digital signals indicating the computer program.

It should also be noted that the present invention may be a computer-readable recording medium on which the computer program or the digital signals are recorded. Examples of the computer-readable recording medium are a flexible disk, a hard disk, a Compact Disc (CD)-ROM, a magnetooptic disk (MO), a Digital Versatile Disc (DVD), a DVD-ROM, a DVD-RAM, a BD (Blue-ray® Disc), and a semiconductor memory. The present invention may be digital signals recorded on the recording medium.

It should also be noted in the present invention that the computer program or the digital signals may be transmitted via an electric communication line, a wired or wireless communication line, a network represented by the Internet, data broadcasting, and the like.

It should also be noted that the present invention may be a computer system including a microprocessor operating according to the computer program and a memory storing the computer program.

It should also be noted that the program or the digital signals may be recorded onto the recording medium to be transferred, or may be transmitted via a network or the like, so that the program or the digital signals can be executed by a different independent computer system.

Figure 28:
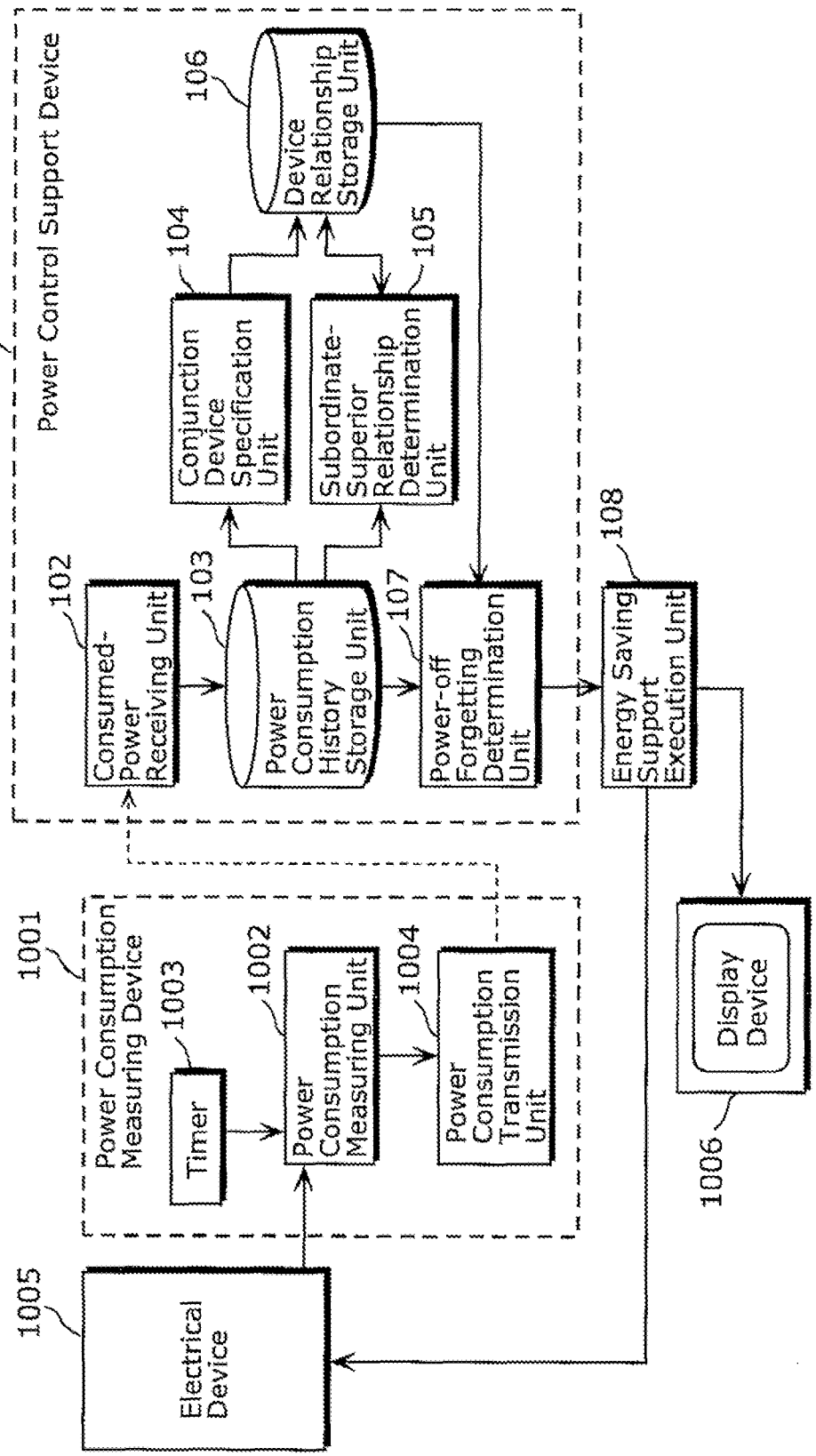
FIG. 28 is a block diagram showing functional structures of an electricity consumption measuring device and an electric power control support device which are included in an energy saving support system according to a variation of the embodiment of the present invention.

It should also be noted that the above-described energy saving support system may have a configuration as shown in FIG. 28. More specifically, although the configuration of the energy saving support system shown in FIG. 3 has the energy saving support execution unit 108 in the electric power control support device 101, the configuration of the energy saving support system shown in FIG. 28 has other configuration elements, not the energy saving support execution unit 108, in the electric power control support device 101. It should also be noted that the energy saving support execution unit 108 is provided outside the electric power control support device, and provided in the energy saving support system.

With the above structure, the electric power control support device 201 determines the subordinate-superior relationships among the electrical devices 1005, based on the histories of operation of the electrical devices 1005. In addition, a device forgotten(s) to be powered OFF can be specified based on the subordinate-superior relationships. More specifically, if a superior device is OFF and a sub device is ON, the sub device is determined as having forgotten to be powered OFF. By using the results of the power-off forgetting determination, it is possible to execute energy saving support to reduce electricity consumption resulting from temporal and also chronic forgetting of powering OFF. As a result, it is possible to execute electric power control support having a high execution efficiency of energy saving for electrical devices.

It should also be noted that the above-described embodiment and its variations may be combined.

The disclosed embodiment and its variations are merely exemplary and do not limit the present invention. The scope of the present invention is indicated not by the above description but by the appended claims. Accordingly, all modifications are intended to be included within the same meanings and the scope of the claims.

INDUSTRIAL APPLICABILITY

The present invention can be applied to an electric power control support device for supporting energy saving of electrical devices, for example.

NUMERICAL REFERENCES 101, 201 electric power control support device
102 electricity consumption receiving unit
103 electricity consumption history storage unit
104 conjunction device specification unit
105 subordinate-superior relationship determination unit
106 device relationship storage unit
107 power-off forgetting determination unit
108 energy saving support execution unit
1001 electricity consumption measuring device
1002 electricity consumption measuring unit
1003 timer
1004 electricity consumption transmission unit
1005 electrical device
1006 display device
2301 sub device use prediction device
2307 sub device use prediction unit

The invention claimed is:

1. An electric power control support device, comprising:
a receiving unit configured to receive pieces of operation data regarding respective devices, the pieces of the operation data each indicating an operating section that is a time period during which a corresponding one of the devices is operating;
a storage unit configured to store the pieces of operation data received by said receiving unit;
a subordinate-superior relationship determination unit configured to determine, from the devices, a superior device that operates independently and a sub device that operates in conjunction with the superior device, based on a temporal position relationship between operating sections temporally overlapping each other between the devices, the temporal position relationship being indicated by the pieces of operation data stored in said storage unit;
a specification unit configured to specify the sub device operating while the superior device is not operating, based on the pieces of operation data regarding the devices which are stored in said storage unit; and
an electric power control support execution unit configured to transmit a signal to one of (a) the sub device specified by said specification unit and (b) a device to perform processing based on an operation state of the sub device, the signal being for supporting electric power control of the sub device based on the operation state of the sub device.

2. The electric power control support device according to claim 1,
wherein said subordinate-superior relationship determination unit is configured to determine whether or not operating start times and operating end times of the operating sections overlapping each other match a predetermined pattern regarding operating start times and operating end times for the superior device and the sub device, so as to determine the superior device and the sub device from the devices.

3. The electric power control support device according to claim 2,
wherein said subordinate-superior relationship determination unit is configured to determine, for each of the devices as a superior device candidate, whether or not the operating start times and the operating end times of the operating sections overlapping each other between the superior device candidate and another device match the predetermined pattern, so as to be more likely to determine the superior device candidate as the superior device when the operating start times and the operating end times match the predetermined pattern at a higher degree.

4. The electric power control support device according to claim 3,
wherein said subordinate-superior relationship determination unit is further configured to determine, for each of the devices as a superior device candidate, whether or not operating start times and operating end times of the operating sections overlapping each other between the superior device candidate and another device match the predetermined pattern, so as to be likely to determine the superior device candidate as the sub device when the superior device candidate has more operating sections not resulting in the match, the operation sections overlapping being included in operation sections of the superior device candidate.

5. The electric power control support device according to claim 2,
wherein in the predetermined pattern, the operating start time for the sub device is within a first predetermined time period from the operating start time for the superior device, and the operating end time for the sub device is within a second predetermined time period from the operating end time for the superior device.

6. The electric power control support device according to claim 2,
wherein in the predetermined pattern, the operating start time for the sub device is within a first predetermined time period from the operating start time for the superior device or subsequent to the operating start time for the superior device, and the operating end time for the sub device is subsequent to a second predetermined time period from the operating end time for the superior device.

7. The electric power control support device according to claim 2,
wherein the predetermined pattern is one of: (i) a pattern in which the operating start time for the sub device is subsequent to a first predetermined time period from the operating start time for the superior device, and the operating end time for the sub device is prior to a second predetermined time period from the operating end time for the superior device; (ii) a pattern in which the operating start time for the sub device is subsequent to the first predetermined time period from the operating start time for the superior device, and the operating end time for the sub device is within the second predetermined time period from the operating end time for the superior device; and (iii) a pattern in which the operating start time for the sub device is within the first predetermined time period from the operating start time for the superior device, and the operating end time for the sub device is prior to the second predetermined time period from the operating end time for the superior device.

8. The electric power control support device according to claim 1, further comprising
a conjunction device specification unit configured to determine, for each combination of two devices in the devices, whether or not operating sections between the two devices overlap each other, based on the pieces of operation data regarding the devices which are stored in said storage unit, so as to be more likely to specify the two devices as operating in conjunction with each other when the determination is made that the operating sections between the two devices overlap each other at a higher degree,
wherein said subordinate-superior relationship determination unit is configured to determine the superior device and the sub device from the two devices specified by said conjunction device specification unit as operating in conjunction with each other.

9. The electric power control support device according to claim 8,
wherein said conjunction device specification unit is configured to be more likely to specify, as operating in conjunction with each other, the two devices having more pairs of the operating sections overlapping each other.

10. The electric power control support device according to claim 8,
wherein said conjunction device specification unit is configured to be more likely to specify, as operating in conjunction with each other, the two devices having a greater ratio of the operating sections overlapping each other between the two devices to total operating sections of one of the two devices.

11. The electric power control support device according to claim 8,
wherein said conjunction device specification unit is configured to be more likely to specify, as operating in conjunction with each other, the two devices having operating sections overlapping each other at a higher degree, by determining whether or not each pair of the operation sections of the devices overlap each other, based on the pieces of operation data regarding the devices in a predetermined time zone in which the user is at a place where the devices are placed.

12. The electric power control support device according to claim 8,
wherein said conjunction device specification unit is configured to be more likely to specify, as operating in conjunction with each other, the two devices having operating sections overlapping each other at a higher degree, by determining whether or not each pair of operation sections of devices included in a predetermined group related to a current passing path overlap each other, by using pieces of operation data regarding the devices included in the predetermined group.

13. The electric power control support device according to claim 12,
wherein the predetermined group related to the current passing path is a group of devices connected to a same current limiter.

14. The electric power control support device according to claim 1,
wherein said electric power control support execution unit is configured to display a second message different from a first message on a display device to facilitate energy saving support for the sub device specified by said specification unit, when an amount of used electricity of the sub device is not reduced after displaying the first message on the display device to facilitate the energy saving support.

15. A sub device use prediction device, comprising
a receiving unit configured to configured to receive pieces of operation data and pieces of electricity consumption data regarding respective devices, the pieces of the operation data each indicating an operating section that is a time period during which a corresponding one of the devices is operating;
a storage unit configured to store the pieces of operation data received by said receiving unit;
a subordinate-superior relationship determination unit configured to determine, from the devices, a superior device that operates independently and a sub device that operates in conjunction with the superior device, based on a temporal position relationship between operating sections temporally overlapping each other between the devices, the temporal position relationship being indicated by the pieces of operation data stored in said storage unit; and
a sub device use prediction unit configured to (i) specify the sub device associated with the superior device starting operation based on the pieces of electricity consumption data regarding the respective devices which are received by said receiving unit and the determination made by said subordinate-superior relationship determination unit, (ii) predict one of an operation start time and an operating time zone of the sub device based on the pieces of electricity consumption data regarding the respective devices which are received by said receiving unit and the determination made by said subordinate-superior relationship determination unit, and (iii) supports electric power control of the sub device based on the predicted one of the operation start time and the operating time zone.

16. An electric power control support method, comprising:
receiving a piece of operation data regarding each of devices, the piece of the operation data indicating an operating section that is a time period during which the each of devices is operating;
determining, from the devices, a superior device that operates independently and a sub device that operates in conjunction with the superior device, based on a temporal position relationship between operating sections including the operating section which temporally overlap each other, the temporal position relationship being indicated by the pieces of operation data stored in said storage unit; and
specifying the sub device operating while the superior device is not operating, based on the pieces of operation data regarding the devices which are stored in said storing; and
transmitting a signal to one of (a) the sub device specified in said specifying and (b) a device to perform processing based on an operation state of the sub device, the signal instructing for supporting electric power control of the sub device based on the operation state of the sub device.

17. A computer program recorded on a non-transitory computer-readable recording medium for use in a computer, the computer program causing the computer to execute:
receiving a piece of operation data regarding each of devices, the piece of the operation data indicating an operating section that is a time period during which the each of devices is operating;
determining, from the devices, a superior device that operates independently and a sub device that operates in conjunction with the superior device, based on a temporal position relationship between operating sections including the operating section which temporally overlap each other, the temporal position relationship being indicated by the pieces of operation data stored in said storage unit; and
specifying the sub device operating while the superior device is not operating, based on the pieces of operation data regarding the devices which are stored in said storing; and
transmitting a signal to one of (a) the sub device specified in said specifying and (b) a device to perform processing based on an operation state of the sub device, the signal instructing for supporting electric power control of the sub device based on the operation state of the sub device.

* * * * *